US008881217B2

(12) United States Patent
Stallings et al.

(10) Patent No.: US 8,881,217 B2
(45) Date of Patent: Nov. 4, 2014

(54) SYSTEMS AND METHODS FOR ACCESSING MEDIA CONTENT

(71) Applicant: Verizon Patent and Licensing Inc., Arlington, VA (US)

(72) Inventors: Heath Stallings, Colleyville, TX (US); Brian F. Roberts, Dallas, TX (US); Donald H. Relyea, Dallas, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 13/858,673

(22) Filed: Apr. 8, 2013

(65) Prior Publication Data

US 2013/0232520 A1    Sep. 5, 2013

Related U.S. Application Data

(63) Continuation of application No. 11/516,291, filed on Sep. 6, 2006, now Pat. No. 8,418,217.

(51) Int. Cl.
| | |
|---|---|
| *H04N 7/173* | (2011.01) |
| *H04N 21/433* | (2011.01) |
| *H04N 21/258* | (2011.01) |
| *H04N 21/4788* | (2011.01) |
| *H04N 5/76* | (2006.01) |
| *H04N 21/426* | (2011.01) |
| *H04N 21/61* | (2011.01) |

(52) U.S. Cl.
CPC ..... *H04N 21/25866* (2013.01); *H04N 21/4334* (2013.01); *H04N 21/4788* (2013.01); *H04N 5/76* (2013.01); *H04N 7/17318* (2013.01); *H04N 21/4263* (2013.01); *H04N 21/6125* (2013.01)
USPC ............... 725/115; 725/80; 725/81; 725/114; 725/119; 725/144; 725/145

(58) Field of Classification Search
CPC .......................... H04N 21/436; H04N 21/4263
USPC ............. 725/80, 81, 114, 115, 119, 144, 145
See application file for complete search history.

(56) References Cited

U.S. PATENT DOCUMENTS

| | | |
|---|---|---|
| 4,977,455 A | 12/1990 | Young |
| 5,151,789 A | 9/1992 | Young |

(Continued)

OTHER PUBLICATIONS

"TiVo Desktop Version 2.2!", "TiVo Desktop Version 2.2!," Tivo.com, http://www.tivo.com/1.2.19asp, two pages, retrieved from the Internet on Aug. 2, 2006.

(Continued)

*Primary Examiner* — Pankaj Kumar
*Assistant Examiner* — Sahar Baig

(57) ABSTRACT

In one embodiment, a media content processing subsystem within a plurality of media content processing subsystems configured to receive transmissions of media content instances from a media content provider by way of a network sends a shared content request to the media content provider, the request being for a media content instance included in the transmissions of media content instances from the media content provider. The request is configured to cause the media content provider to identify at least one other media content processing subsystem within the plurality of media content processing subsystems that is able to provide the media content instance to the media content processing subsystem, and instruct the at least one other media content processing subsystem to transmit, to the media content processing subsystem, the media content instance received by the at least one other media content processing subsystem from the media content provider.

18 Claims, 7 Drawing Sheets

(56) References Cited

U.S. PATENT DOCUMENTS

| | | |
|---|---|---|
| 5,158,155 A | 10/1992 | Domain et al. |
| 5,253,066 A | 10/1993 | Vogel |
| 5,307,173 A | 4/1994 | Yuen et al. |
| 5,335,079 A | 8/1994 | Yuen et al. |
| 5,353,121 A | 10/1994 | Young et al. |
| 5,382,983 A | 1/1995 | Kwoh et al. |
| 5,442,390 A | 8/1995 | Hooper et al. |
| 5,473,362 A | 12/1995 | Fitzgerald et al. |
| 5,479,266 A | 12/1995 | Young et al. |
| 5,479,268 A | 12/1995 | Young et al. |
| 5,499,103 A | 3/1996 | Mankovitz |
| 5,510,811 A | 4/1996 | Tobey et al. |
| 5,512,963 A | 4/1996 | Mankovitz |
| 5,515,173 A | 5/1996 | Mankovitz et al. |
| 5,517,257 A | 5/1996 | Dunn et al. |
| 5,532,732 A | 7/1996 | Yuen et al. |
| 5,532,754 A | 7/1996 | Young et al. |
| 5,541,738 A | 7/1996 | Mankovitz |
| 5,550,576 A | 8/1996 | Klosterman |
| 5,553,123 A | 9/1996 | Chan et al. |
| 5,559,550 A | 9/1996 | Mankovitz |
| 5,585,838 A | 12/1996 | Lawler et al. |
| 5,600,368 A | 2/1997 | Matthews |
| 5,600,711 A | 2/1997 | Yuen |
| 5,616,876 A | 4/1997 | Cluts |
| 5,619,274 A | 4/1997 | Roop et al. |
| 5,623,613 A | 4/1997 | Rowe et al. |
| 5,630,119 A | 5/1997 | Aristides et al. |
| 5,640,484 A | 6/1997 | Mankovitz |
| 5,648,824 A | 7/1997 | Dunn et al. |
| 5,654,748 A | 8/1997 | Matthews |
| 5,657,072 A | 8/1997 | Aristides et al. |
| 5,671,398 A | 9/1997 | Neubauer |
| 5,673,401 A | 9/1997 | Volk et al. |
| 5,677,708 A | 10/1997 | Matthews et al. |
| 5,678,012 A | 10/1997 | Kimmich et al. |
| 5,682,511 A | 10/1997 | Sposato et al. |
| 5,684,525 A | 11/1997 | Klosterman |
| 5,687,331 A | 11/1997 | Volk et al. |
| 5,689,663 A | 11/1997 | Williams |
| 5,694,176 A | 12/1997 | Bruette et al. |
| 5,699,107 A | 12/1997 | Lawler et al. |
| 5,701,383 A | 12/1997 | Russo et al. |
| 5,706,145 A | 1/1998 | Hindman et al. |
| 5,721,829 A | 2/1998 | Dunn et al. |
| 5,724,492 A | 3/1998 | Matthews et al. |
| 5,727,060 A | 3/1998 | Young |
| 5,731,844 A | 3/1998 | Rauch et al. |
| 5,734,786 A | 3/1998 | Mankovitz |
| 5,734,823 A | 3/1998 | Saigh et al. |
| 5,734,891 A | 3/1998 | Saigh |
| 5,745,095 A | 4/1998 | Parchem et al. |
| 5,745,713 A | 4/1998 | Ferguson et al. |
| 5,751,282 A | 5/1998 | Girard et al. |
| 5,752,160 A | 5/1998 | Dunn |
| 5,757,417 A | 5/1998 | Aras et al. |
| 5,758,258 A | 5/1998 | Shoff et al. |
| 5,758,259 A | 5/1998 | Lawler |
| 5,774,172 A | 6/1998 | Kapell et al. |
| 5,781,228 A | 7/1998 | Sposato |
| 5,790,115 A | 8/1998 | Pleyer et al. |
| 5,790,198 A | 8/1998 | Roop et al. |
| 5,793,973 A | 8/1998 | Birdwell et al. |
| 5,801,787 A | 9/1998 | Schein et al. |
| 5,805,165 A | 9/1998 | Thorne et al. |
| 5,805,763 A | 9/1998 | Lawler et al. |
| 5,808,608 A | 9/1998 | Young et al. |
| 5,809,204 A | 9/1998 | Young et al. |
| 5,812,123 A | 9/1998 | Rowe et al. |
| 5,812,205 A | 9/1998 | Milnes et al. |
| 5,815,145 A | 9/1998 | Matthews |
| 5,815,195 A | 9/1998 | Tam |
| 5,828,945 A | 10/1998 | Klosterman |
| 5,857,190 A | 1/1999 | Brown |
| 5,861,906 A | 1/1999 | Dunn et al. |
| 5,870,150 A | 2/1999 | Yuen |
| 5,872,588 A | 2/1999 | Aras et al. |
| 5,874,985 A | 2/1999 | Matthews |
| 5,878,141 A | 3/1999 | Daly et al. |
| 5,883,627 A | 3/1999 | Pleyer |
| 5,886,746 A | 3/1999 | Yuen et al. |
| 5,900,905 A | 5/1999 | Shoff et al. |
| 5,905,522 A | 5/1999 | Lawler |
| 5,907,323 A | 5/1999 | Lawler et al. |
| 5,914,746 A | 6/1999 | Matthews et al. |
| 5,915,026 A | 6/1999 | Mankovitz |
| 5,923,362 A | 7/1999 | Klosterman |
| 5,940,073 A | 8/1999 | Klosterman et al. |
| 5,940,074 A | 8/1999 | Britt et al. |
| 5,945,987 A | 8/1999 | Dunn |
| 5,945,991 A | 8/1999 | Britt et al. |
| 5,949,954 A | 9/1999 | Young et al. |
| 5,959,688 A | 9/1999 | Schein et al. |
| 5,969,748 A | 10/1999 | Casement et al. |
| 5,970,206 A | 10/1999 | Yuen et al. |
| 5,974,222 A | 10/1999 | Yuen et al. |
| 5,987,213 A | 11/1999 | Mankovitz et al. |
| 5,987,509 A | 11/1999 | Portuesi |
| 5,988,078 A | 11/1999 | Levine |
| 5,990,883 A | 11/1999 | Byrne et al. |
| 5,991,498 A | 11/1999 | Young |
| 6,002,394 A | 12/1999 | Schein et al. |
| 6,002,852 A | 12/1999 | Birdwell et al. |
| 6,005,563 A | 12/1999 | White et al. |
| 6,008,803 A | 12/1999 | Rowe et al. |
| 6,008,836 A | 12/1999 | Bruck et al. |
| 6,014,706 A | 1/2000 | Cannon et al. |
| 6,016,141 A | 1/2000 | Knudson et al. |
| 6,025,837 A | 2/2000 | Matthews et al. |
| 6,028,599 A | 2/2000 | Yuen et al. |
| 6,028,604 A | 2/2000 | Matthews et al. |
| 6,034,689 A | 3/2000 | White et al. |
| 6,049,652 A | 4/2000 | Yuen et al. |
| 6,052,145 A | 4/2000 | Macrae et al. |
| 6,055,314 A | 4/2000 | Spies et al. |
| D424,061 S | 5/2000 | Backs et al. |
| D424,577 S | 5/2000 | Backs et al. |
| 6,072,485 A | 6/2000 | Barnes et al. |
| 6,072,983 A | 6/2000 | Klosterman |
| 6,075,551 A | 6/2000 | Berezowski et al. |
| 6,075,575 A | 6/2000 | Schein et al. |
| 6,078,348 A | 6/2000 | Klosterman et al. |
| 6,091,882 A | 7/2000 | Yuen et al. |
| 6,098,086 A | 8/2000 | Krueger et al. |
| 6,118,492 A | 9/2000 | Milnes et al. |
| D431,552 S | 10/2000 | Backs et al. |
| 6,133,909 A | 10/2000 | Schein et al. |
| 6,133,913 A | 10/2000 | White et al. |
| 6,137,950 A | 10/2000 | Yuen |
| 6,141,003 A | 10/2000 | Chor et al. |
| 6,141,678 A | 10/2000 | Britt |
| D433,403 S | 11/2000 | Backs et al. |
| D434,043 S | 11/2000 | Holland et al. |
| 6,144,378 A | 11/2000 | Lee |
| 6,144,401 A | 11/2000 | Casement et al. |
| 6,144,964 A | 11/2000 | Breese et al. |
| 6,151,059 A | 11/2000 | Schein et al. |
| 6,154,205 A | 11/2000 | Carroll et al. |
| D435,561 S | 12/2000 | Pettigrew et al. |
| 6,160,549 A | 12/2000 | Touma et al. |
| 6,167,188 A | 12/2000 | Young et al. |
| 6,169,541 B1 | 1/2001 | Smith |
| 6,173,317 B1 | 1/2001 | Chaddha et al. |
| 6,177,931 B1 | 1/2001 | Alexander et al. |
| 6,177,945 B1 | 1/2001 | Pleyer |
| 6,182,072 B1 | 1/2001 | Leak et al. |
| 6,184,877 B1 | 2/2001 | Dodson et al. |
| 6,188,401 B1 | 2/2001 | Peyer |
| 6,215,483 B1 | 4/2001 | Zigmond |
| 6,215,526 B1 | 4/2001 | Barton et al. |
| 6,216,265 B1 | 4/2001 | Roop et al. |
| 6,230,319 B1 | 5/2001 | Britt et al. |
| 6,233,389 B1 | 5/2001 | Barton et al. |
| 6,237,022 B1 | 5/2001 | Bruck et al. |

(56) References Cited

U.S. PATENT DOCUMENTS

| | | |
|---|---|---|
| 6,239,794 B1 | 5/2001 | Yuen et al. |
| 6,240,555 B1 | 5/2001 | Shoff et al. |
| 6,247,176 B1 | 6/2001 | Schein et al. |
| D445,801 S | 7/2001 | Ma |
| 6,259,442 B1 | 7/2001 | Britt et al. |
| 6,262,722 B1 | 7/2001 | Allison et al. |
| 6,263,501 B1 | 7/2001 | Schein et al. |
| 6,266,059 B1 | 7/2001 | Matthews et al. |
| 6,268,856 B1 | 7/2001 | Bruck et al. |
| 6,292,834 B1 | 9/2001 | Ravi et al. |
| 6,304,969 B1 | 10/2001 | Wasserman et al. |
| 6,308,202 B1 | 10/2001 | Cohn et al. |
| 6,310,886 B1 | 10/2001 | Barton |
| 6,311,197 B2 | 10/2001 | Mighdoll et al. |
| 6,311,207 B1 | 10/2001 | Mighdoll et al. |
| D450,058 S | 11/2001 | Istvan et al. |
| D450,324 S | 11/2001 | Istvan et al. |
| D450,711 S | 11/2001 | Istvan et al. |
| 6,313,851 B1 | 11/2001 | Matthews et al. |
| 6,317,780 B1 | 11/2001 | Cohn et al. |
| 6,317,791 B1 | 11/2001 | Cohn et al. |
| 6,317,885 B1 | 11/2001 | Fries |
| 6,323,911 B1 | 11/2001 | Schein et al. |
| 6,327,418 B1 | 12/2001 | Barton |
| 6,330,719 B1 | 12/2001 | Zigmond et al. |
| 6,340,997 B1 | 1/2002 | Borseth |
| 6,341,195 B1 | 1/2002 | Mankovitz et al. |
| 6,341,374 B2 | 1/2002 | Schein et al. |
| D453,767 S | 2/2002 | Istvan et al. |
| D453,768 S | 2/2002 | Wilkins |
| D453,936 S | 2/2002 | Istvan et al. |
| 6,344,865 B1 | 2/2002 | Matthews et al. |
| 6,345,264 B1 | 2/2002 | Breese et al. |
| 6,347,398 B1 | 2/2002 | Parthasarathy et al. |
| 6,348,935 B1 | 2/2002 | Malacinski et al. |
| 6,353,813 B1 | 3/2002 | Breese et al. |
| 6,378,035 B1 | 4/2002 | Parry et al. |
| 6,380,957 B1 | 4/2002 | Banning |
| 6,385,739 B1 | 5/2002 | Barton et al. |
| 6,388,714 B1 | 5/2002 | Schein et al. |
| 6,392,664 B1 | 5/2002 | White et al. |
| 6,396,473 B1 | 5/2002 | Callahan et al. |
| 6,396,546 B1 | 5/2002 | Alten et al. |
| 6,397,388 B1 | 5/2002 | Allen |
| 6,400,407 B1 | 6/2002 | Zigmond et al. |
| 6,412,110 B1 | 6/2002 | Schein et al. |
| 6,412,112 B1 | 6/2002 | Barrett et al. |
| 6,421,072 B1 | 7/2002 | Ku et al. |
| 6,424,342 B1 | 7/2002 | Perlman et al. |
| 6,425,125 B1 | 7/2002 | Fries et al. |
| 6,430,358 B1 | 8/2002 | Yuen et al. |
| 6,430,359 B1 | 8/2002 | Yuen et al. |
| D462,333 S | 9/2002 | Novak |
| D462,339 S | 9/2002 | Allen et al. |
| D463,444 S | 9/2002 | Istvan et al. |
| 6,449,766 B1 | 9/2002 | Fleming |
| 6,453,471 B1 | 9/2002 | Klosterman |
| D463,788 S | 10/2002 | Smith et al. |
| 6,460,180 B1 | 10/2002 | Park et al. |
| 6,460,181 B1 | 10/2002 | Donnelly |
| 6,463,486 B1 | 10/2002 | Parry et al. |
| 6,466,734 B2 | 10/2002 | Yuen et al. |
| 6,469,721 B2 | 10/2002 | Matthews et al. |
| 6,469,753 B1 | 10/2002 | Klosterman et al. |
| 6,473,858 B1 | 10/2002 | Shimomura et al. |
| D465,227 S | 11/2002 | Ro et al. |
| 6,477,705 B1 | 11/2002 | Yuen et al. |
| 6,480,836 B1 | 11/2002 | Colby et al. |
| 6,487,646 B1 | 11/2002 | Adams et al. |
| 6,489,986 B1 | 12/2002 | Allen |
| 6,490,722 B1 | 12/2002 | Barton et al. |
| 6,496,205 B1 | 12/2002 | White et al. |
| 6,498,754 B2 | 12/2002 | Peting et al. |
| 6,498,895 B2 | 12/2002 | Young et al. |
| 6,499,057 B1 | 12/2002 | Portuesi |
| D468,274 S | 1/2003 | Novak |
| D469,104 S | 1/2003 | Istvan et al. |
| D469,443 S | 1/2003 | Wilkins et al. |
| 6,505,232 B1 | 1/2003 | Mighdoll et al. |
| 6,505,348 B1 | 1/2003 | Knowles et al. |
| D470,152 S | 2/2003 | Witus |
| D470,153 S | 2/2003 | Billmaier et al. |
| 6,519,771 B1 | 2/2003 | Zenith |
| 6,526,471 B1 | 2/2003 | Shimomura et al. |
| 6,526,580 B2 | 2/2003 | Shimomura et al. |
| 6,529,233 B1 | 3/2003 | Allen |
| 6,535,253 B2 | 3/2003 | Barton et al. |
| 6,535,920 B1 | 3/2003 | Parry et al. |
| 6,538,701 B1 | 3/2003 | Yuen |
| 6,539,375 B2 | 3/2003 | Kawasaki |
| 6,549,719 B2 | 4/2003 | Mankovitz |
| D474,197 S | 5/2003 | Nguyen |
| 6,559,866 B2 | 5/2003 | Kolde et al. |
| 6,559,894 B2 | 5/2003 | Omura et al. |
| 6,560,678 B1 | 5/2003 | Weissman et al. |
| 6,560,777 B2 | 5/2003 | Blackketter et al. |
| 6,564,379 B1 | 5/2003 | Knudson et al. |
| 6,567,606 B2 | 5/2003 | Milnes et al. |
| 6,571,390 B1 | 5/2003 | Dunn et al. |
| 6,571,392 B1 | 5/2003 | Zigmond et al. |
| D475,718 S | 6/2003 | Witus et al. |
| 6,577,346 B1 | 6/2003 | Perlman |
| D476,994 S | 7/2003 | Simmons et al. |
| 6,588,013 B1 | 7/2003 | Lumley et al. |
| 6,594,653 B2 | 7/2003 | Colby et al. |
| D478,090 S | 8/2003 | Nguyen et al. |
| D478,595 S | 8/2003 | Wilkins et al. |
| D478,912 S | 8/2003 | Johnson |
| 6,606,652 B1 | 8/2003 | Cohn et al. |
| 6,628,301 B1 | 9/2003 | Acton et al. |
| 6,628,302 B2 | 9/2003 | White et al. |
| D480,733 S | 10/2003 | Hammerquist et al. |
| 6,630,963 B1 | 10/2003 | Billmaier |
| 6,631,523 B1 | 10/2003 | Matthews et al. |
| 6,633,877 B1 | 10/2003 | Saigh et al. |
| 6,637,031 B1 | 10/2003 | Chou |
| 6,637,032 B1 | 10/2003 | Feinleib |
| 6,642,939 B1 | 11/2003 | Vallone et al. |
| 6,643,798 B2 | 11/2003 | Barton et al. |
| 6,651,251 B1 | 11/2003 | Shoff et al. |
| RE38,376 E | 12/2003 | Matthews, III |
| 6,662,218 B2 | 12/2003 | Mighdoll et al. |
| 6,668,133 B2 | 12/2003 | Yuen et al. |
| 6,668,377 B1 | 12/2003 | Dunn |
| 6,670,581 B1 | 12/2003 | Smith |
| 6,678,737 B1 | 1/2004 | Bucher |
| 6,681,396 B1 | 1/2004 | Bates et al. |
| 6,683,630 B1 | 1/2004 | Shoff et al. |
| 6,684,025 B1 | 1/2004 | Perlman |
| D486,834 S | 2/2004 | Allen et al. |
| 6,687,906 B1 | 2/2004 | Yuen et al. |
| 6,694,352 B1 | 2/2004 | Omoigui |
| 6,698,020 B1 | 2/2004 | Zigmond et al. |
| 6,704,058 B2 | 3/2004 | Ranta |
| 6,704,773 B1 | 3/2004 | Cohn et al. |
| 6,704,776 B1 | 3/2004 | Fortune |
| 6,704,813 B2 | 3/2004 | Smirnov et al. |
| 6,704,929 B1 | 3/2004 | Ozer et al. |
| 6,708,335 B1 | 3/2004 | Ozer et al. |
| 6,710,815 B1 | 3/2004 | Billmaier et al. |
| 6,721,953 B1 | 4/2004 | Bates et al. |
| 6,724,405 B2 | 4/2004 | Matthews et al. |
| 6,727,935 B1 | 4/2004 | Allen et al. |
| 6,728,713 B1 | 4/2004 | Beach et al. |
| D490,086 S | 5/2004 | Wilkins et al. |
| 6,732,325 B1 | 5/2004 | Tash et al. |
| 6,732,369 B1 | 5/2004 | Schein et al. |
| 6,742,043 B1 | 5/2004 | Moussa et al. |
| 6,742,183 B1 | 5/2004 | Reynolds et al. |
| 6,745,391 B1 | 6/2004 | Macrae et al. |
| 6,748,375 B1 | 6/2004 | Wong et al. |
| 6,748,481 B1 | 6/2004 | Parry et al. |
| 6,754,626 B2 | 6/2004 | Epstein |
| 6,754,715 B1 | 6/2004 | Cannon et al. |

(56) References Cited

U.S. PATENT DOCUMENTS

| | | |
|---|---|---|
| 6,756,997 B1 | 6/2004 | Ward et al. |
| 6,757,837 B1 | 6/2004 | Platt et al. |
| 6,757,906 B1 | 6/2004 | Look et al. |
| 6,760,537 B2 | 7/2004 | Mankovitz |
| 6,762,773 B2 | 7/2004 | Kolde et al. |
| 6,766,523 B2 | 7/2004 | Herley |
| 6,766,524 B1 | 7/2004 | Matheny et al. |
| D494,186 S | 8/2004 | Johnson |
| 6,772,438 B1 | 8/2004 | Blackketter et al. |
| 6,785,901 B1 | 8/2004 | Horiwitz et al. |
| 6,785,902 B1 | 8/2004 | Zigmond et al. |
| D496,665 S | 9/2004 | Billmaier et al. |
| 6,792,195 B2 | 9/2004 | Barton |
| 6,798,457 B2 | 9/2004 | Boyden et al. |
| 6,798,971 B2 | 9/2004 | Potrebic |
| 6,799,326 B2 | 9/2004 | Boylan et al. |
| 6,799,327 B1 | 9/2004 | Reynolds et al. |
| 6,804,824 B1 | 10/2004 | Potrebic et al. |
| 6,804,825 B1 | 10/2004 | White et al. |
| 6,813,643 B2 | 11/2004 | Perlman |
| 6,816,175 B1 | 11/2004 | Hamp et al. |
| 6,819,344 B2 | 11/2004 | Robbins |
| 6,820,111 B1 | 11/2004 | Rubin et al. |
| 6,820,144 B2 | 11/2004 | Smirnov et al. |
| 6,829,779 B1 | 12/2004 | Perlman |
| 6,842,837 B1 | 1/2005 | Peting et al. |
| 6,847,778 B1 | 1/2005 | Vallone et al. |
| 6,847,779 B2 | 1/2005 | Pietraszak |
| 6,850,691 B1 | 2/2005 | Stam et al. |
| 6,850,693 B2 | 2/2005 | Young et al. |
| 6,859,799 B1 | 2/2005 | Yuen |
| 6,859,937 B1 | 2/2005 | Narayan et al. |
| 6,861,952 B1 | 3/2005 | Billmaier |
| 6,865,555 B2 | 3/2005 | Novak |
| 6,868,225 B1 | 3/2005 | Brown et al. |
| 6,868,551 B1 | 3/2005 | Lawler et al. |
| 6,886,179 B1 | 4/2005 | Perlman |
| 6,891,553 B2 | 5/2005 | White et al. |
| 6,892,390 B1 | 5/2005 | Lieberman et al. |
| 6,897,904 B2 | 5/2005 | Potrebic et al. |
| 6,898,765 B2 | 5/2005 | Matthews et al. |
| 6,901,453 B1 | 5/2005 | Pritchett et al. |
| 6,903,753 B1 | 6/2005 | Gray et al. |
| 6,904,609 B1 | 6/2005 | Pietraszak et al. |
| 6,906,755 B2 | 6/2005 | Lundblad et al. |
| 6,907,576 B2 | 6/2005 | Barbanson et al. |
| 6,915,528 B1 | 7/2005 | McKenna |
| 6,928,652 B1 | 8/2005 | Goldman |
| 6,928,655 B1 | 8/2005 | Omoigui |
| 6,931,657 B1 | 8/2005 | Marsh |
| 6,938,077 B2 | 8/2005 | Sanders |
| 6,938,270 B2 | 8/2005 | Blackketter et al. |
| 6,941,575 B2 | 9/2005 | Allen |
| 6,943,843 B2 | 9/2005 | Boyden et al. |
| 6,944,880 B1 | 9/2005 | Allen |
| 6,947,935 B1 | 9/2005 | Horvitz et al. |
| 6,952,208 B1 | 10/2005 | Arquie et al. |
| 6,957,260 B1 | 10/2005 | Mighdoll et al. |
| 6,963,903 B2 | 11/2005 | Krueger et al. |
| 6,963,906 B2 | 11/2005 | Portuesi |
| 6,965,415 B2 | 11/2005 | Lundblad et al. |
| 6,965,730 B2 | 11/2005 | Chamberlin et al. |
| 6,966,066 B1 | 11/2005 | Zigmond et al. |
| 6,968,364 B1 | 11/2005 | Wong et al. |
| 6,970,640 B2 | 11/2005 | Green et al. |
| 6,972,787 B1 | 12/2005 | Allen et al. |
| 6,973,050 B2 | 12/2005 | Birdwell et al. |
| 6,973,664 B2 | 12/2005 | Fries |
| 6,973,669 B2 | 12/2005 | Daniels |
| 6,975,713 B1 | 12/2005 | Smith et al. |
| 6,975,717 B1 | 12/2005 | Smith et al. |
| 6,978,473 B1 | 12/2005 | Nsonwu et al. |
| 6,980,638 B1 | 12/2005 | Smith |
| 6,980,993 B2 | 12/2005 | Horvitz et al. |
| 6,981,227 B1 | 12/2005 | Taylor |
| 6,983,426 B1 | 1/2006 | Kobayashi et al. |
| 6,986,062 B2 | 1/2006 | Carpenter |
| 6,990,462 B1 | 1/2006 | Wilcox et al. |
| 6,990,497 B2 | 1/2006 | O'Rourke et al. |
| 6,990,671 B1 | 1/2006 | Evans et al. |
| 6,990,677 B1 | 1/2006 | Pietraszak et al. |
| 6,990,678 B2 | 1/2006 | Zigmond |
| 6,993,532 B1 | 1/2006 | Platt et al. |
| 6,996,390 B2 | 2/2006 | Herley et al. |
| 7,003,795 B2 | 2/2006 | Allen |
| 7,006,613 B2 | 2/2006 | Novak et al. |
| 7,007,244 B2 | 2/2006 | Pankovcin |
| D516,573 S | 3/2006 | Gibson |
| D517,059 S | 3/2006 | Newby et al. |
| D517,087 S | 3/2006 | Sands |
| 7,010,265 B2 | 3/2006 | Coffin |
| 7,013,238 B1 | 3/2006 | Weare |
| 7,015,925 B2 | 3/2006 | Ford et al. |
| 7,017,174 B1 | 3/2006 | Sheedy |
| D518,487 S | 4/2006 | MacKenzie et al. |
| D519,122 S | 4/2006 | MacKenzie et al. |
| D519,519 S | 4/2006 | Vong |
| D519,521 S | 4/2006 | Fong |
| 7,023,492 B2 | 4/2006 | Sullivan |
| 7,024,424 B1 | 4/2006 | Platt et al. |
| 7,026,964 B2 | 4/2006 | Baldwin et al. |
| 7,027,101 B1 | 4/2006 | Sloo et al. |
| 7,028,325 B1 | 4/2006 | Rui et al. |
| 7,030,886 B2 | 4/2006 | Ford et al. |
| 7,032,177 B2 | 4/2006 | Novak et al. |
| 7,034,776 B1 | 4/2006 | Love |
| 7,034,927 B1 | 4/2006 | Allen et al. |
| 7,035,355 B2 | 4/2006 | Lais et al. |
| 7,035,526 B2 | 4/2006 | Green |
| 7,036,083 B1 | 4/2006 | Zenith |
| 7,036,090 B1 | 4/2006 | Nguyen |
| 7,036,091 B1 | 4/2006 | Nguyen |
| 7,036,092 B2 | 4/2006 | Sloo et al. |
| 7,036,138 B1 | 4/2006 | Tash |
| 7,038,690 B2 | 5/2006 | Wilt et al. |
| 7,039,935 B2 | 5/2006 | Knudson et al. |
| 7,042,526 B1 | 5/2006 | Borseth |
| 7,043,477 B2 | 5/2006 | Mercer et al. |
| 7,046,805 B2 | 5/2006 | Fitzhardinge et al. |
| 7,050,097 B2 | 5/2006 | Schick et al. |
| 7,050,867 B2 | 5/2006 | Maymudes |
| 7,051,111 B1 | 5/2006 | Scullin |
| 7,051,282 B2 | 5/2006 | Marcjan |
| 7,051,351 B2 | 5/2006 | Goldman et al. |
| 7,055,031 B2 | 5/2006 | Platt |
| 7,055,104 B1 | 5/2006 | Billmaier et al. |
| 7,058,720 B1 | 6/2006 | Majidimehr |
| 7,058,816 B2 | 6/2006 | Valeria |
| 7,058,936 B2 | 6/2006 | Chilimbi et al. |
| 7,062,475 B1 | 6/2006 | Szabo et al. |
| 7,065,553 B1 | 6/2006 | Chesley et al. |
| 7,069,284 B2 | 6/2006 | Peting |
| 7,069,576 B1 | 6/2006 | Knudson et al. |
| 7,071,968 B2 | 7/2006 | Novak |
| 7,073,118 B2 | 7/2006 | Greenberg et al. |
| 7,073,193 B2 | 7/2006 | Marsh |
| 7,076,202 B2 | 7/2006 | Billmaier |
| 7,076,734 B2 | 7/2006 | Wolff et al. |
| 7,076,792 B2 | 7/2006 | Zigmond et al. |
| 7,076,794 B2 | 7/2006 | Lieberman et al. |
| 7,080,394 B2 | 7/2006 | Istvan et al. |
| 7,088,374 B2 | 8/2006 | David et al. |
| 7,088,910 B2 | 8/2006 | Potrebic et al. |
| 7,093,273 B2 | 8/2006 | Marsh |
| 7,098,868 B2 | 8/2006 | Love et al. |
| 7,099,952 B2 | 8/2006 | Wong et al. |
| 7,103,904 B1 | 9/2006 | Blackketter et al. |
| 7,103,905 B2 | 9/2006 | Novak |
| 7,103,908 B2 | 9/2006 | Tomsen |
| 7,107,532 B1 | 9/2006 | Billmaier et al. |
| 7,107,608 B2 | 9/2006 | Wagner et al. |
| 7,111,320 B1 | 9/2006 | Novak |
| 7,116,894 B1 | 10/2006 | Chatterton |
| 7,117,439 B2 | 10/2006 | Barrett et al. |

(56) References Cited

U.S. PATENT DOCUMENTS

| | | |
|---|---|---|
| 7,124,369 B2 | 10/2006 | Beaudoin |
| 7,127,127 B2 | 10/2006 | Jojic et al. |
| 7,130,846 B2 | 10/2006 | Danker et al. |
| 7,131,054 B2 | 10/2006 | Greenberg et al. |
| 7,142,230 B2 | 11/2006 | Novak et al. |
| 7,146,632 B2 | 12/2006 | Miller |
| 7,155,675 B2 | 12/2006 | Billmaier et al. |
| 7,155,734 B1 | 12/2006 | Shimomura et al. |
| 7,158,531 B2 | 1/2007 | Barton |
| 7,159,176 B2 | 1/2007 | Billmaier et al. |
| 7,159,177 B2 | 1/2007 | Billmaier et al. |
| 7,161,877 B2 | 1/2007 | Lai et al. |
| 7,161,994 B2 | 1/2007 | Shah et al. |
| 7,162,728 B1 | 1/2007 | Bahn |
| 7,165,264 B1 | 1/2007 | Westrick |
| 7,167,531 B2 | 1/2007 | Greenberg et al. |
| 7,194,511 B2 | 3/2007 | Stettner |
| 7,194,754 B2 | 3/2007 | Tomsen |
| 7,197,234 B1 | 3/2007 | Chatterton |
| 7,197,715 B1 | 3/2007 | Valeria |
| 7,200,321 B2 | 4/2007 | Otala et al. |
| 7,200,859 B1 | 4/2007 | Perlman et al. |
| 7,203,952 B2 | 4/2007 | Broadus |
| 7,210,093 B1 | 4/2007 | Dutta |
| 7,216,235 B1 | 5/2007 | Platt |
| 7,228,556 B2 | 6/2007 | Beach et al. |
| 7,236,204 B2 | 6/2007 | Perlman |
| 7,237,252 B2 | 6/2007 | Billmaier |
| 7,242,413 B2 | 7/2007 | Chu et al. |
| 7,243,123 B1 | 7/2007 | Allen et al. |
| 7,245,817 B1 | 7/2007 | Nichols et al. |
| 7,251,255 B1 | 7/2007 | Young |
| 7,251,294 B2 | 7/2007 | Peting |
| 7,263,362 B1 | 8/2007 | Young et al. |
| D551,668 S | 9/2007 | Newby et al. |
| 7,266,785 B2 | 9/2007 | Grotjohn |
| 7,266,832 B2 | 9/2007 | Miller |
| 7,266,835 B2 | 9/2007 | Halbert |
| 7,272,298 B1 | 9/2007 | Lang et al. |
| 7,272,657 B2 | 9/2007 | Allen et al. |
| D552,610 S | 10/2007 | Newby et al. |
| 7,290,222 B2 | 10/2007 | Guido et al. |
| 7,302,696 B1 | 11/2007 | Yamamoto |
| 7,310,355 B1 | 12/2007 | Krein et al. |
| 7,313,802 B1 | 12/2007 | Tomsen |
| 7,320,134 B1 | 1/2008 | Tomsen et al. |
| 7,320,137 B1 | 1/2008 | Novak et al. |
| 7,321,716 B1 | 1/2008 | Vallone et al. |
| 7,340,761 B2 | 3/2008 | Billmaier |
| 7,350,157 B1 | 3/2008 | Billmaier et al. |
| 7,360,167 B2 | 4/2008 | Hennum et al. |
| 7,360,175 B2 | 4/2008 | Gardner et al. |
| 7,360,232 B2 | 4/2008 | Mitchell |
| 7,380,260 B1 | 5/2008 | Billmaier et al. |
| 7,382,838 B2 | 6/2008 | Peting |
| 7,386,129 B2 | 6/2008 | Perlman |
| 7,391,808 B1 | 6/2008 | Farrand |
| 7,409,546 B2 | 8/2008 | Platt |
| 7,418,670 B2 | 8/2008 | Goldsmith |
| 7,428,023 B2 | 9/2008 | Allen et al. |
| 7,434,246 B2 | 10/2008 | Florence |
| 7,440,523 B2 | 10/2008 | Lais et al. |
| 7,463,737 B2 | 12/2008 | Gillon |
| 7,466,640 B2 | 12/2008 | Snow et al. |
| 7,475,365 B2 | 1/2009 | Nan et al. |
| 7,484,234 B1 | 1/2009 | Heaton |
| 7,487,459 B2 | 2/2009 | Billmaier et al. |
| 7,487,529 B1 | 2/2009 | Orlick |
| 7,493,015 B1 | 2/2009 | Van Stam et al. |
| 7,496,830 B2 | 2/2009 | Rubin et al. |
| 7,506,350 B2 | 3/2009 | Johnson |
| 7,518,629 B2 | 4/2009 | Novak et al. |
| 7,529,465 B2 | 5/2009 | Barton et al. |
| 7,533,355 B2 | 5/2009 | Aritomi |
| 7,533,403 B1 | 5/2009 | Krein et al. |
| 7,543,325 B2 | 6/2009 | Westbrook et al. |
| 7,546,622 B2 | 6/2009 | Tash |
| 7,558,472 B2 | 7/2009 | Locket et al. |
| 7,571,156 B1 | 8/2009 | Gupta et al. |
| 7,573,529 B1 | 8/2009 | Perlman |
| 7,574,656 B2 | 8/2009 | Billmaier et al. |
| 7,587,679 B1 | 9/2009 | Sundermeyer et al. |
| 7,590,240 B2 | 9/2009 | Platt et al. |
| 7,594,246 B1 | 9/2009 | Billmaier et al. |
| 7,596,533 B2 | 9/2009 | Szabo et al. |
| 7,600,185 B2 | 10/2009 | Asakawa et al. |
| 7,600,243 B2 | 10/2009 | Brain et al. |
| 7,603,022 B2 | 10/2009 | Putterman et al. |
| 7,650,569 B1 | 1/2010 | Allen et al. |
| 7,661,121 B2 | 2/2010 | Smith et al. |
| 7,665,111 B1 | 2/2010 | Barton |
| 7,668,435 B2 | 2/2010 | Lockett et al. |
| 7,671,758 B1 | 3/2010 | Seidel et al. |
| 2001/0029610 A1 | 10/2001 | Corvin et al. |
| 2001/0047298 A1 | 11/2001 | Moore et al. |
| 2001/0049820 A1 | 12/2001 | Barton |
| 2001/0054181 A1 | 12/2001 | Corvin |
| 2002/0069415 A1 | 6/2002 | Humbard et al. |
| 2002/0073424 A1 | 6/2002 | Ward et al. |
| 2002/0124255 A1 | 9/2002 | Reichardt et al. |
| 2003/0005445 A1 | 1/2003 | Schein et al. |
| 2003/0056219 A1 | 3/2003 | Reichardt et al. |
| 2003/0061611 A1 | 3/2003 | Pendakur |
| 2003/0093613 A1 | 5/2003 | Sherman |
| 2003/0110495 A1 | 6/2003 | Bennington et al. |
| 2003/0110499 A1 | 6/2003 | Knudson et al. |
| 2003/0110500 A1 | 6/2003 | Rodriguez |
| 2003/0115599 A1 | 6/2003 | Bennington et al. |
| 2003/0115602 A1 | 6/2003 | Knee et al. |
| 2003/0163813 A1 | 8/2003 | Klosterman et al. |
| 2003/0164858 A1 | 9/2003 | Klosterman et al. |
| 2003/0188310 A1 | 10/2003 | Klosterman et al. |
| 2003/0188311 A1 | 10/2003 | Yuen et al. |
| 2003/0196201 A1 | 10/2003 | Schein et al. |
| 2003/0204847 A1 | 10/2003 | Ellis et al. |
| 2003/0208756 A1 | 11/2003 | Macrae et al. |
| 2003/0221192 A1 | 11/2003 | Rappaport et al. |
| 2004/0010806 A1 | 1/2004 | Yuen et al. |
| 2004/0045025 A1 | 3/2004 | Ward et al. |
| 2004/0093562 A1 | 5/2004 | Diorio et al. |
| 2004/0107437 A1 | 6/2004 | Reichardt et al. |
| 2004/0168189 A1 | 8/2004 | Reynolds et al. |
| 2004/0194138 A1 | 9/2004 | Boylan et al. |
| 2004/0194141 A1 | 9/2004 | Sanders |
| 2004/0239809 A1 | 12/2004 | Kim et al. |
| 2004/0243938 A1 | 12/2004 | Weise |
| 2004/0261098 A1 | 12/2004 | Macrae et al. |
| 2005/0010949 A1 | 1/2005 | Ward et al. |
| 2005/0028201 A1 | 2/2005 | Klosterman et al. |
| 2005/0028208 A1 | 2/2005 | Ellis et al. |
| 2005/0076092 A1 | 4/2005 | Chang et al. |
| 2005/0076312 A1 | 4/2005 | Gardner et al. |
| 2005/0125823 A1 | 6/2005 | McCoy et al. |
| 2005/0149964 A1 | 7/2005 | Thomas et al. |
| 2005/0155056 A1 | 7/2005 | Knee et al. |
| 2005/0160456 A1 | 7/2005 | Moskowitz |
| 2005/0216936 A1 | 9/2005 | Knudson et al. |
| 2005/0251824 A1 | 11/2005 | Thomas et al. |
| 2005/0257154 A1 | 11/2005 | Bales et al. |
| 2005/0257172 A1 | 11/2005 | Bales et al. |
| 2005/0278768 A1 | 12/2005 | Boyer et al. |
| 2006/0026639 A1 | 2/2006 | Potrebic et al. |
| 2006/0095937 A1 | 5/2006 | Knudson et al. |
| 2006/0130098 A1 | 6/2006 | Rao et al. |
| 2006/0156336 A1 | 7/2006 | Knudson et al. |
| 2006/0190615 A1* | 8/2006 | Panwar et al. ............ 709/231 |
| 2006/0212894 A1 | 9/2006 | Knudson et al. |
| 2006/0253594 A1 | 11/2006 | Szabo et al. |
| 2006/0277316 A1 | 12/2006 | Wang et al. |
| 2006/0277574 A1 | 12/2006 | Schein et al. |
| 2006/0288366 A1 | 12/2006 | Boylan et al. |
| 2007/0016926 A1 | 1/2007 | Ward et al. |
| 2007/0033613 A1 | 2/2007 | Ward et al. |
| 2007/0043829 A1 | 2/2007 | Dua |

(56) References Cited

U.S. PATENT DOCUMENTS

| | | |
|---|---|---|
| 2007/0104456 A1* | 5/2007 | Craner .......................... 386/83 |
| 2007/0107010 A1 | 5/2007 | Jolna et al. |
| 2007/0124751 A1 | 5/2007 | Le Fevre et al. |
| 2007/0180485 A1 | 8/2007 | Dua |
| 2007/0198930 A1 | 8/2007 | Chu et al. |
| 2008/0022308 A1 | 1/2008 | Garcea |
| 2008/0066135 A1 | 3/2008 | Brodersen et al. |
| 2009/0024603 A1 | 1/2009 | Zink |
| 2009/0125843 A1 | 5/2009 | Billmaier et al. |

OTHER PUBLICATIONS

"TiVo con Getting Started Step-by-Step", "TiVo.com, Getting Started Step-by-Step," TiVo.com, http://www.tivo.com/4.9.16.asp, two pages, retrieved from the internet on Aug. 2, 2006.

* cited by examiner

SYSTEMS AND METHODS FOR ACCESSING MEDIA CONTENT

RELATED APPLICATIONS

This application is a continuation application of U.S. patent application Ser. No. 11/516,291, filed on Sep. 6, 2006, and entitled SYSTEMS AND METHODS FOR ACCESSING MEDIA CONTENT, which is hereby incorporated by reference in its entirety.

BACKGROUND INFORMATION

The advent of computers, interactive electronic communication, the Internet, and other advances in the digital realm of consumer electronics have resulted in a great variety of programming, recording, and viewing options for users who view media content such as television programs. In implementing such enhanced programming, the set-top box (STB) has become an important computing device for accessing media content services and the media content within those services. In addition to supporting traditional analog broadcast video functionality, STBs also support an increasing number of two-way digital services such as video-on-demand, internet protocol television (IPTV), and personal video recording.

An STB is typically connected to a cable or satellite, or generally, a subscriber television system, and includes hardware and software necessary to provide the functionality of the subscriber television system at a user site. While many STBs are stand-alone devices that are externally connected to a television, an STB and/or its functionality may be integrated into a television or personal computer, a mobile device such as a mobile phone or personal digital assistant (PDA), or even into an audio device such as a programmable radio, as is known.

An STB is usually configured to provide users with a large number and variety of media content choices. For example, a user may choose to record and/or experience (e.g., view) a variety of broadcast television programs, pay-per-view services, video-on-demand programming, Internet services, and audio programming via an STB.

Conventional STBs, however, are traditionally limited to receiving media content from a media content provider (e.g., from a headend unit broadcasting signals including media content). Typically, an STB tuner is used to tune the STB to a particular media (e.g., television) channel, stream, address, frequency or other carrier in order to receive and process the media content that is transmitted by the media content provider on that carrier. A standard STB tuner can receive and process only one media content instance at a time. Accordingly, conventional STBs are limited in the number of different media content instances (e.g., television programs) that can be concurrently received and processed. For instance, an STB with a single tuner is able to receive and process only one media content instance at a time, while an STB with dual tuners can receive and process up to two media content instances at a time.

Limits on the number of media content instances that can be concurrently received and processed by an STB can be frustrating to a user who wishes to view and/or record multiple media content instances that are broadcast by a media content provider at concurrent or overlapping times. For example, a user of an STB having dual tuners may wish but be unable to receive and record three different television shows that are broadcast during the same time period or overlapping time periods. This scenario is not uncommon given the large amounts of media content being broadcast, as well as a common practice among broadcasters of scheduling broadcasts of popular media (e.g., television shows) at concurrent or overlapping times in order to compete with one another. Because of the costs associated with STB tuners and their installation, the addition of more tuners to conventional STBs is generally undesirable and often impractical.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical reference numbers designate identical or similar elements.

DETAILED DESCRIPTION OF PREFERRED EMBODIMENTS

I. Introduction

Exemplary systems and methods for accessing media content are described herein. As used herein, the term "media content instance" will be used to refer generally to any television program, on-demand program, pay-per-view program, broadcast media program, video-on demand program, commercial, advertisement, video, multimedia, movie, song, photograph, audio programming, network services (e.g., Internet), or any segment or combination of these or other forms of media content that may be presented to and experienced (e.g., viewed) by a user.

The exemplary systems and methods described herein generally enable a media content processing subsystem, such as a set-top box (STB), that is communicatively coupled to a media content provider to concurrently receive media content from the media content provider and from at least one other STB that is also communicatively coupled to the media content provider. For example, the STB may be configured to receive a first media content instance from the media content provider and to concurrently receive at least a portion of a second media content instance from at least one other STB that is also communicatively coupled to the media content provider. In certain embodiments, the STB uses a tuner to receive the first media content instance, but does not use a tuner to receive the second media content instance.

The capacity of the STB for receiving media content is generally increased by the STB being able to leverage the recording capabilities of other STBs communicatively coupled to the media content provider. For example, a user of an STB having a single tuner may wish to receive (e.g., record) multiple media content instances (e.g., television shows such as COPS and FRIENDS) that will be broadcast by the media content provider at concurrent or overlapping times. The STB may receive one of the media content instances (e.g., COPS) from the media content provider (using the tuner for example). Because the resources of the STB are being used to receive COPS, the STB may not be able to concurrently tune to another media content instance. However, the STB receive the second media content instance (e.g., FRIENDS) from another source such as one or more other STBs communicatively coupled to the media content provider and that happen to be recording (or have previously recorded) the second media content instance. In this manner, the collective recording capabilities of a group of STBs can be used to increase the receiving capacity of any STB in the group by enabling the STBs to share recorded content with one another.

Components and functions of exemplary embodiments of systems and methods for accessing media content will now be described in more detail.

II. Exemplary System View

Figure 1:
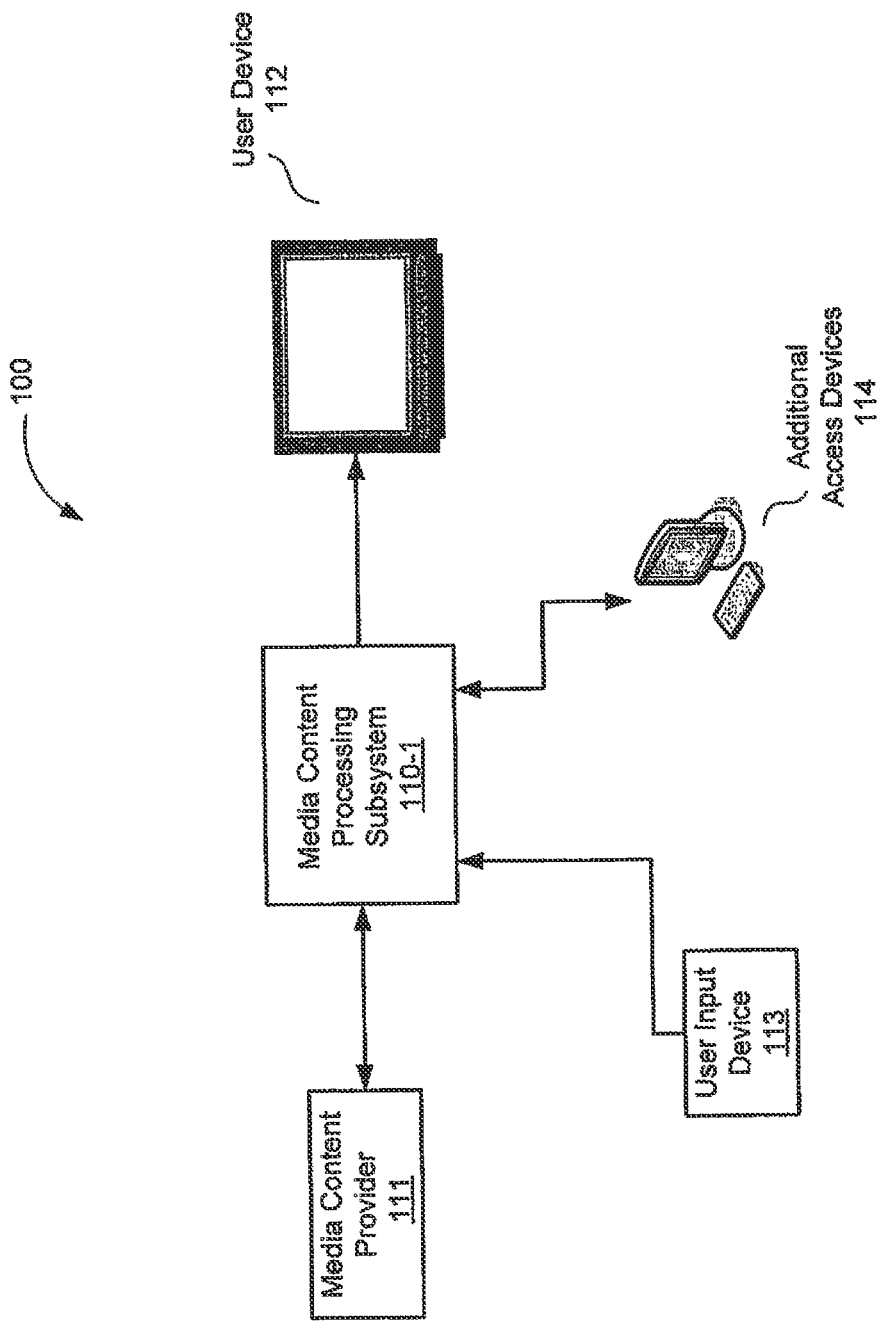
FIG. 1 illustrates an example of a media content access system, according to an embodiment.

FIG. 1 illustrates an example of a media content access system 100, according to one embodiment. Media content access system 100 may take many different forms and include multiple and/or alternate components and facilities.

As shown in FIG. 1, a media content processing subsystem 110-1 is configured to communicate with and receive a signal or data stream (e.g., a media content stream) containing a media content instance from a media content provider 111. The media content processing subsystem 110-1 and media content provider 111 may communicate using any known communication technologies, devices, media, and protocols supportive of remote data communications, including, but not limited to, cable networks, subscriber television networks, satellite networks, the Internet, intranets, local area networks, wireless networks (e.g., mobile telephone networks), optical fiber networks, data transmission media, communications devices, Transmission Control Protocol ("TCP"), Internet Protocol ("IP"), File Transfer Protocol ("FTP"), Telnet, Hypertext Transfer Protocol ("HTTP"), socket connections, Ethernet, and other suitable communications networks and technologies.

The media content processing subsystem 110-1 may use any suitable technologies to receive the media content instance from the media content provider 111, including using a tuner to receive the media content instance, as described below. The media content processing subsystem 110-1 may be configured to process the media content stream provided by the media content provider 111, including causing the media content instance, or one or more components (e.g., video and/or audio components) of the media content instance, to be presented for experiencing (e.g., viewing) by a user. The presentation of the media content instance may include, but is not limited to, displaying, playing back, or otherwise processing the media content instance, or one or more components of the media content instance, such that it may be experienced by the user. For example, the media content processing subsystem 110-1 may provide a signal to a user device 112 (e.g., a television, computer monitor, etc.) so that the user device 112 may present (e.g., display) the media content instance for experiencing by the user. Alternatively or additionally, the media content processing subsystem 110-1 may be configured to record the media content instance for subsequent presentation and/or for sharing with other media content processing subsystems in communication with the media content provider, as will be described further below in reference to FIGS. 4 and 5.

The media content processing subsystem 110-1 may be controlled by a user input device 113 (e.g., an infrared remote control device) and/or a number of additional access devices 114 (e.g., a personal computer, wireless device, cellular telephone, etc.).

In addition to receiving content from the media content provider 111, the media content processing subsystem 110-1 may be configured to receive media content ("shared media content") from other media content processing subsystems communicatively coupled to the media content provider 111, as described below. Accordingly, media content can be concurrently received from the media content provider 111 and from one or more other media content processing subsystems communicatively coupled to the media content provider 111.

While an exemplary media content access system 100 is shown in FIG. 1, the exemplary components illustrated in FIG. 1 are not intended to be limiting. Indeed, additional or alternative components and/or implementations may be used, as is well known. Certain elements of the media content access system 100 will now be described in additional detail in relation to examples of the media content processing subsystem 110-1 receiving media content from the media content provider 111 and from one or more other media content processing subsystems.

A. Media Content Received from a Media Content Provider

Media content provider 111 may be configured to provide various types of media content to media content processing subsystem 110-1. The media content may be provided via a satellite, cable system, subscriber television network, the Internet, optical fiber network, wireless network, or any other suitable network or communication technologies, including any of the communication technologies mentioned above.

Figure 2:
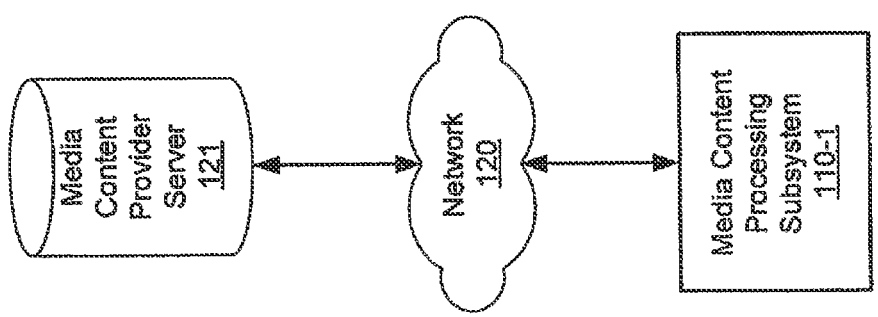
FIG. 2 is an illustration of an exemplary media content provider network, according to an embodiment.

An exemplary media content provider 111 includes a media content provider server 121, as shown in FIG. 2. The media content provider server 121 may be configured to communicate with the media content processing subsystem 110-1 via one or more types of networks 120 (and communications links thereto). The network 120 shown in FIG. 2 may include the Internet, an intranet or other private packet-switched network, a cable television network (e.g., a hybrid fiber-coax network), a wireless broadcast network (e.g., a satellite media broadcasting network or terrestrial broadcasting network), a telephone network, a provider-specific network (e.g., a Verizon® FIOS® network and/or a TiVo® network), an optical fiber network, or any other suitable network. Typically, the network 120 provides the media content processing subsystem 110-1 with an external (e.g., external of a structure such as a residence in which the media content processing subsystem 110-1 is located) connection to the media content provider 111. In some alternative examples, the processing subsystem 110-1 may be connected directly to the media content provider server 121. While FIG. 2 shows a single media content provider server 121, in other embodiments, the media content provider 111 may include multiple media content servers and/or other devices potentially useful for communications between the media content provider 111 and the media content processing subsystem 110-1.

Figure 3:
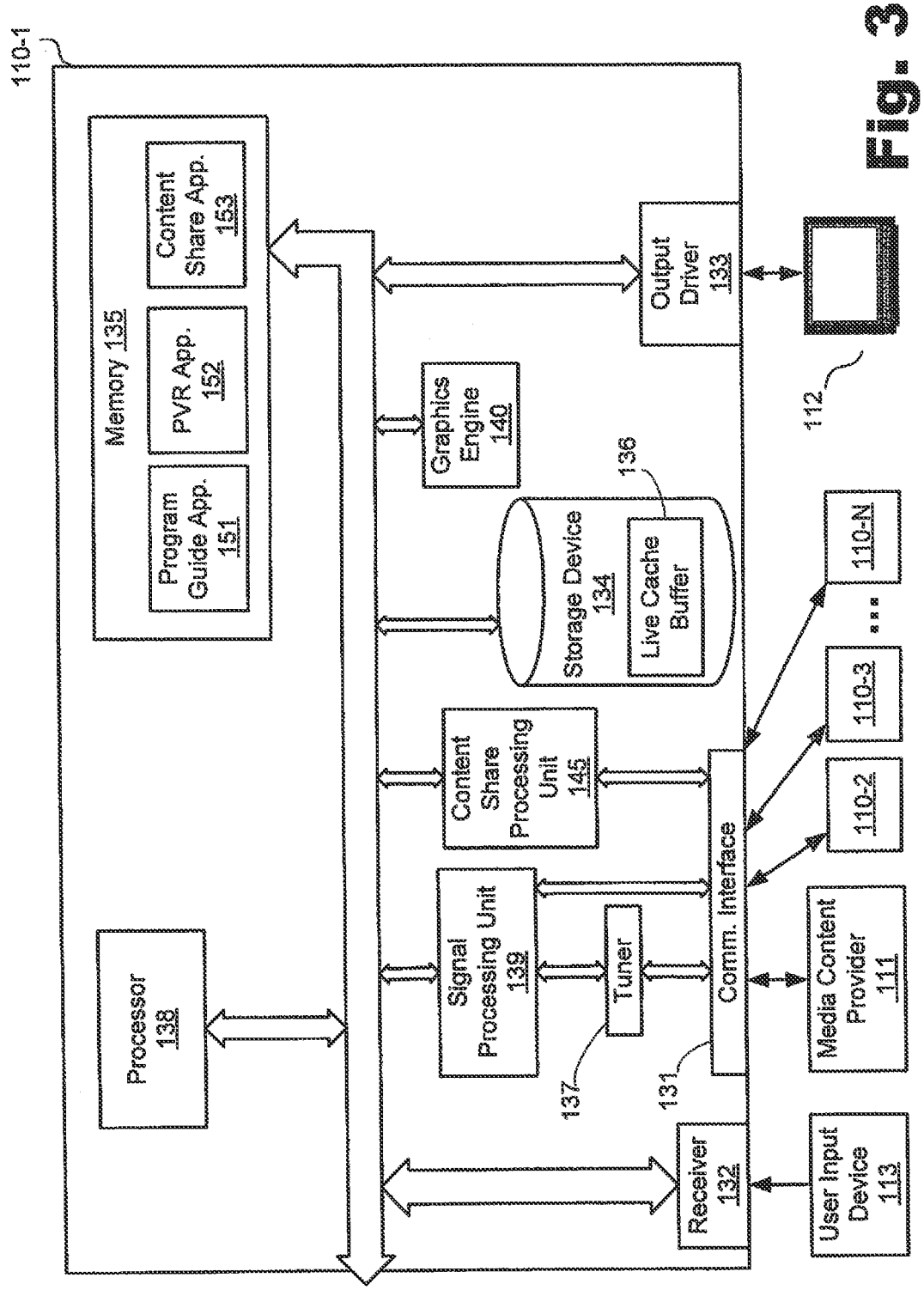
FIG. 3 is a block diagram of an exemplary media content processing subsystem, according to an embodiment.

Media content processing subsystem 110-1 is configured to receive and process media content provided by the media content provider 111 over the network 120. FIG. 3 is a block diagram of an exemplary media content processing subsystem 110-1 (or simply "processing subsystem 110-1") according to an embodiment. While an exemplary processing subsystem 110-1 is shown in FIG. 3, the exemplary components illustrated in FIG. 3 are not intended to be limiting. Indeed, additional or alternative components and/or implementations may be used.

The processing subsystem 110-1 may include any combination of hardware, software, and firmware configured to process an incoming media content stream. As used herein and in the appended claims, unless otherwise specifically denoted, the terms "media content processing subsystem" and "processing subsystem" will be used to refer expansively to all possible receivers that receive and decode digital and/or analog media content. Hence, an exemplary processing subsystem 110-1 may include, but is not limited to, a set-top box (STB), home communication terminal (HCT), digital home communication terminal (DHCT), stand-alone personal video recorder (PVR), digital video disc (DVD) player, video-enabled phone, and personal computer.

In certain embodiments, the processing subsystem 110-1 may include any computer hardware and/or instructions (e.g., software programs), or combinations of software and hardware, configured to perform the processes described herein. In particular, it should be understood that processing subsystem 110-1 may be implemented on one physical computing device or may be implemented on more than one physical computing device. Accordingly, processing subsystem 110-1 may include any one of a number of well known computing devices, and may employ any of a number of well known computer operating systems, including, but by no means limited to, known versions and/or varieties of the Microsoft Windows® operating system, the Unix operating system, Macintosh® operating system, and the Linux operating system.

Accordingly, the processes described herein may be implemented at least in part as instructions executable by one or more computing devices. In general, a processor (e.g., a microprocessor) receives instructions, e.g., from a memory, a computer-readable medium, etc., and executes those instructions, thereby performing one or more processes, including one or more of the processes described herein. Such instructions may be stored and transmitted using a variety of known computer-readable media.

A computer-readable medium (also referred to as a processor-readable medium) includes any medium that participates in providing data (e.g., instructions) that may be read by a computer (e.g., by a processor of a computer). Such a medium may take many forms, including, but not limited to, non-volatile media, volatile media, and transmission media. Non-volatile media may include, for example, optical or magnetic disks and other persistent memory. Volatile media may include, for example, dynamic random access memory ("DRAM"), which typically constitutes a main memory. Transmission media may include, for example, coaxial cables, copper wire and fiber optics, including the wires that comprise a system bus coupled to a processor of a computer. Transmission media may include or convey acoustic waves, light waves, and electromagnetic emissions, such as those generated during radio frequency ("RF"), infrared ("IR"), and other wireless data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

1. Communication Interfaces

As shown in FIG. 3, the processing subsystem 110-1 may include a communication interface 131 configured to receive media content from the media content provider 111. The communication interface 131 may also be configured to receive media content from one or more other media content processing subsystems 110-2 through 110-N, which may be communicatively coupled to media content processing subsystem 110-1 and media content provider 111, as described below in reference to FIG. 4.

The communication interface 131 may include any device, logic, and other technologies suitable for receiving signals and/or data representative of media content. In certain embodiments, the communication interface 131 may include a single port configured to receive media content from both the media content provider 111 and the other media content processing subsystems 110-2 through 110-N. For example, the communication interface 131 may include or be connected to a broadband connection, which can enable processing subsystem 110-1 to receive media content on a single port from both the media content provider 111 and other processing subsystems 110-2 through 110-N. In other embodiments, multiple ports may be used. The communication interface 131 can be configured to interface with any suitable communication media, protocols, and formats, including any of those mentioned above.

As is well known, the processing subsystem 110 may also include a receiver 132 configured to receive input commands from a user input device 113, which may include, for example, a remote control, keyboard, or any other suitable input device configured to communicate with the receiver 132 via a wireless link (e.g., an IR or Wi-Fi link), electrical connection, or any other suitable communication link.

The processing subsystem 110-1 may also include an output driver 133 configured to interface with or drive the user device 112. The output driver 133 may include any combination of hardware, software, and firmware as may serve a particular application.

2. Storage Devices

Storage device 134 may include one or more data storage media, devices, or configurations and may employ any type, form, and combination of storage media. For example, the storage device 134 may include, but is not limited to, a hard drive, network drive, flash drive, magnetic disc, optical disc, external storage device (e.g., a USB drive), or other non-volatile storage unit. As will be described in more detail below, various portions of media content may be temporarily and/or permanently stored in the storage device 134.

The storage device 134 of FIG. 3 is shown to be a part of the processing subsystem 110-1 for illustrative purposes only. It will be understood that the storage device 134 may additionally or alternatively be located external to the processing subsystem 110-1.

The processing subsystem 110-1 may also include memory 135. Memory 135 may include, but is not limited to, FLASH memory, random access memory (RAM), dynamic RAM (DRAM), or a combination thereof. In some examples, as will be described in more detail below, various applications (e.g., a PVR application) used by the processing subsystem 110-1 may reside in memory 135.

As shown in FIG. 3, the storage device 134 may include one or more live cache buffers 136. The live cache buffer 136 may additionally or alternatively reside in memory 135 or in a storage device external to the processing subsystem 110-1. As will be described in more detail below, media content data may be temporarily stored in the live cache buffer 136 to facilitate viewing of the media content in one or more trick play modes.

3. Tuner

Tuner 137 is configured to tune to a particular media (e.g., television) channel, stream, address, frequency or other carrier in order to process media content that is transmitted on that carrier. In some examples, the tuner 137 may include multiple tuners such that multiple carriers of media content may be processed. For example, the tuner 137 may include a first tuner configured to receive an analog video signal corresponding to a first media content instance and a second tuner configured to simultaneously receive a digital compressed stream corresponding to a second media content instance. It will be recognized that the tuner 137 may have any number of tuners configured to receive any kind of media content from the media content provider 111. As mentioned above, each tuner included in processing subsystem 110-1 may be used to receive media content from the media content provider 111 but is generally able to tune to only one media channel at a time.

In some examples, media content received at the tuner 137 is temporarily buffered, or stored, in the live cache buffer 136. If there are multiple tuners 137, there may be a live cache buffer 136 corresponding to each of the tuners 137. Once media content is temporarily stored in the live cache buffer 136, the user may then designate whether the media content is to be permanently stored as a permanent recording in the storage device 134 or whether it is to be deleted. As used herein, the term "permanent recording" will be understood to mean media content that is stored for an extended period of time as decided by the user.

While tuner 137 may be used to receive various types of media-content-carrying signals broadcast by media content provider 111, media content processing subsystem 110-1 may be configured to receive other types of media content signals from the media content provider 111 without using a tuner. For example, media content provider 111 may broadcast digital streams of data packets (e.g., Internet Protocol (IP) based data packets) that can be received without using a tuner. For such types of media content signals, the communication interface 131 may receive and forward the signals directly to the signal processing unit 139 without going through the tuner 137. For an IP media content signal, for example, the signal processing unit 139 may function as an IP receiver.

4. Processors

As shown in FIG. 3, the processing subsystem 110-1 may include one or more processors, such as processor 138 configured to control the operations of the processing subsystem 110-1. The processing subsystem 110-1 may also include a signal processing unit 139 configured to process incoming media content. The signal processing unit 139 may be configured, for example, to demodulate and parse encoded digital media content, or to convert analog media content to digital form and vice versa. In some examples, the processing subsystem 110-1 may include one or more signal processing units 139 corresponding to each of the tuners 137.

The processing subsystem 110-1 may also include a shared content processing unit 145 configured to process shared media content received from and/or transmitted to other media content processing subsystems 110-2 through 110-N. In certain embodiments, the shared content processing unit 145 is configured to receive and process shared media content independently of the tuner 137.

The shared content processing unit 145 may be communicatively coupled to the communications interface 131 and other elements of the processing subsystem 110-1 as shown in FIG. 3. The shared content processing unit 145 may be configured to selectively process media content received by the communications interface 131. For example, the shared content processing unit 145 may be configured to identify and assemble data representative of shared content (e.g., data packets) received by the communication interface 131 from one or more of the other processing subsystems 110-2 through 110-N. The shared content may be assembled into one or more media content instances.

The shared content processing unit 145 may also be configured to prepare and transmit media content stored in the storage device 134 over the network 120 to other media content processing subsystems 110-2 through 110-N such that the processing subsystem 110-1 is able to function as a provider of shared media content.

The shared content processing unit 145 may also be configured to communicate with the media content provider 111 via the communication interface 131, including sending and receiving communications related to media content sharing functions, as described below.

While FIG. 3 shows the shared content processing unit 145 to be separate from other component of the processing subsystem 110-1, this is not limiting. In certain other embodiments, the shared content processing unit 145 and/or its functionality may be integrated with one or more of the other components, such as the signal processing unit 139, for example. In an exemplary embodiment in which the shared content processing unit 145 is integrated with the signal processing unit 139, the signal processing unit 139 may be directly connected to the communication interface 131 such that media content can still be received from the other processing subsystems 110-2 through 110-N without use of the tuner 137.

The processing subsystem 110-1 may also include a graphics engine 140 configured to generate graphics that are to be displayed by the user device 112. The graphics may include, but are not limited to, views of media content instances (or components of media content instances), program guides, progress bars, control options, and other graphics. One or more processors of the processing subsystem 110-1 (e.g., processor 138 and/or graphics engine 140) may generate and provide output signals configured to cause the user device 112 to display contents of the output signals. Output signals may be provided to the user device 112 by way of the output driver 133.

5. Application Clients

One or more applications 151-153 residing within the processing subsystem 110-1 may be executed upon initiation either by a user of the processing subsystem 110-1, by another processing subsystem, or by the media content provider 111. The applications 151-153, or application clients, may reside in memory 135 or in any other area of the processing subsystem 110-1 and be executed by the processor 138.

As shown in FIG. 3, one of the applications may be a program guide application 151 configured to generate a program guide that is displayed on the user device 112. An exemplary program guide includes a graphical user interface (GUI) that performs various functions including allowing a user to select and view program information associated with various media content instances.

The processing subsystem 110-1 may also include a personal video recording (PVR) application 152. A PVR application is also referred to as a digital video recording (DVR) application. As used herein and in the appended claims, unless otherwise specifically denoted, the term "PVR application" will be used to refer to any application and/or device configured to record media content and/or provide for the viewing of media content in normal or trick play mode. Trick play modes may include, but are not limited to, slow motion, fast motion, reverse play, fast forward play, instant replay, jumping, pausing of live broadcast, and scanning. The PVR application 152 may provide for media content recording functionality by enabling the temporary and/or permanent recording of media content to the storage device 134.

Media content that has been recorded (e.g., stored to the storage device 134) by the PVR application 152 can be shared with other processing subsystems 110-2 through 110-N communicatively coupled to the media content provider 111. Examples of media content being shared between different ones of the processing subsystems 110-1 through 110-N will be described further below.

In some examples, the PVR application 152 may be integrated into the processing subsystem 110-1, as shown in FIG. 3, or it may be a stand-alone unit. A stand-alone PVR may be communicatively coupled to the processing subsystem 110-1. In the examples contained herein, it will be assumed that the PVR application 152 is integrated into the processing subsystem 110-1 for illustrative purposes only.

The processing system 110-1 may also include a content share application 153, which may be initiated by a user of the processing subsystem 110-1, by another processing subsystem, or by the media content provider 111. In certain embodiments, execution of the content share application 153 causes the processing subsystem 110-1 to perform one or more of the functions described herein and related to content sharing between the media content processing subsystems 110-1 through 110-N. Exemplary media content sharing functions and elements configured to perform those functions will now be described in detail.

B. Media Content Shared between Media Content Processing Subsystems

In addition to receiving media content from the media content provider 111, the processing subsystem 110-1, as mentioned above, may also be configured to receive shared media content from one or more of the other processing subsystems 110-2 through 110-N. In certain embodiments, a tuner (e.g., tuner 137) is used to receive media content from the media content provider 111, while shared media content is received from one or more other processing subsystems 110-2 through 110-N without the use of a tuner.

Figure 4:
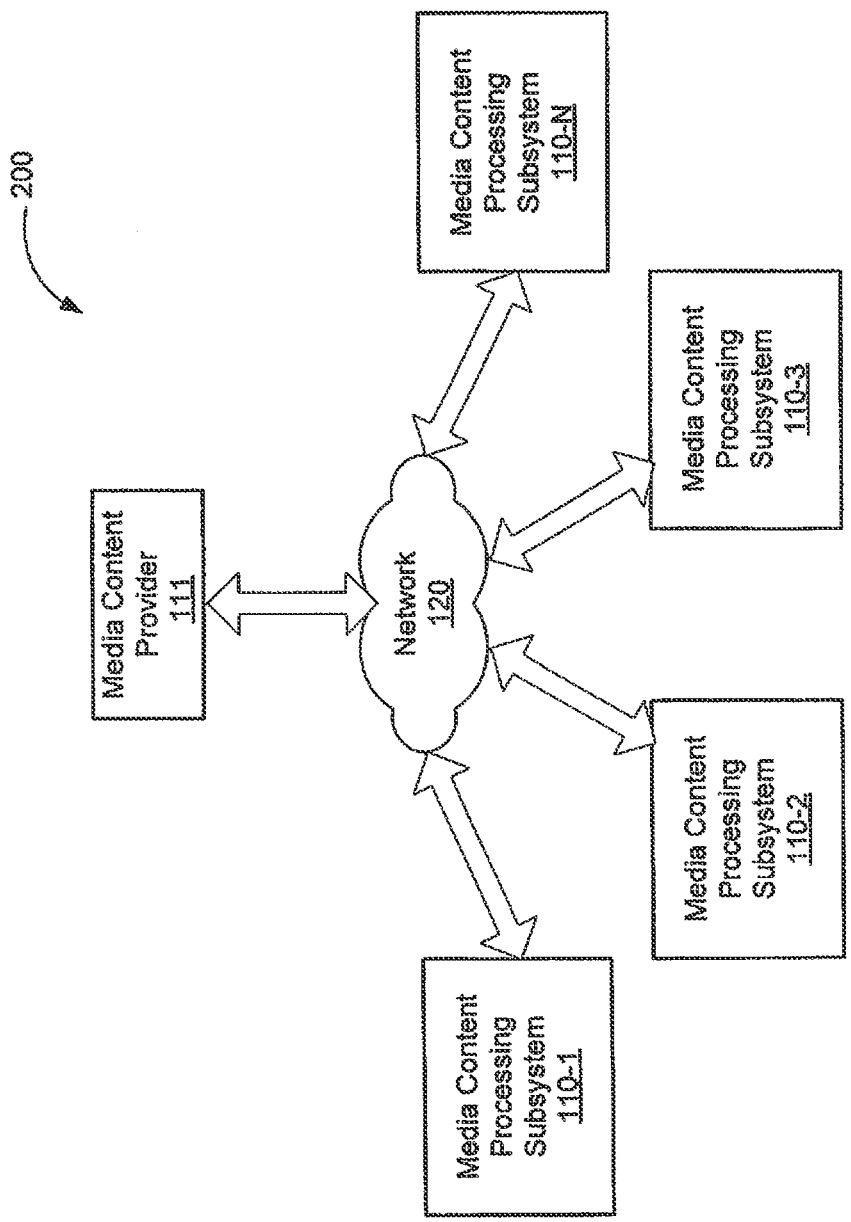
FIG. 4 illustrates an exemplary media content access system configured for sharing of media content between multiple media content processing subsystems communicatively coupled to a media content provider, according to an embodiment.

FIG. 4 illustrates an exemplary media content access system 200 in which the processing subsystems 110-1 through 110-N (collectively referred to as the "processing subsystems 110") are communicatively coupled to one another and to media content provider 111 by network 120. System 200 may be configured to support the sharing of media content between different ones of the processing subsystems 110 over the network 120. Typically, the network 120 provides the media content processing subsystem 110-1 with an external (e.g., external of a structure such as a residence in which the media content processing subsystem 110-1 is located) connection to the media content provider 111 and to other media content processing subsystem 110-2 through 110-N connected to the network 120.

In the following description, processing subsystem 110-1 is described as a recipient of shared media content from one or more of the other processing subsystems 110-2 through 110-N. However, this is for illustrative purposes only and not limiting. Any of the processing subsystems 110 may be configured to act as a recipient and/or provider of shared media content.

The processing subsystem 110-1 may be configured to invoke the content share application 153 in response to the occurrence of any of one or more predetermined events, including receipt of a predefined input command. In certain embodiments, for example, the user of the processing subsystem 110-1 may initiate a request for shared media content from other processing subsystems 110-2 through 110-N. The processing subsystem 110-1 may provide the user with functionality that enables the user to expressly request shared content. Alternatively or additionally, the processing subsystem 110-1 may be configured to automatically invoke content sharing functionality when the user requests media content and each of the tuners 137 of the processing subsystem 110-1 will be busy receiving other media content.

For example, the processing subsystem 110-1 may include a single tuner (e.g., tuner 137), and the user may request to receive and process two separate media content instances that will be broadcast at substantially concurrent times, or even that will have portions broadcast at substantially concurrent times. For instance, the user may wish to concurrently record both media content instances or to record one media content instance while also viewing the other media content instance. In response to the user making such a request, the processing subsystem 110-1 may use the tuner 137 to receive and process one of the requested media content instances and request and receive the other requested media content instance from one or more of the processing subsystems 110-2 through 110-N. The other requested media content instance may be obtained from one or more of the processing subsystems 110-2 through 110-N, without using the tuner 137. Accordingly, content sharing between the processing subsystems 110 generally increases the capacity of the processing subsystem 110-1 such that it can concurrently receive and process more media content instances than there are tuners in the processing subsystem 110-1.

In certain embodiments, content sharing between the processing subsystems 110 can be used to "heal" incomplete recordings of media content. For example, processing subsystem 110-1 may be interrupted (e.g., by a power outage) such that it is not able to store all of a particular media content instance being recorded. Processing subsystem 110-1 may be configured to use one or more recording(s) of the media content instance stored elsewhere on the network 120 to "heal" the incomplete recording. For instance, processing subsystem 110-1 may complete the incomplete recording (e.g., an incomplete file) by adding missing portions of the recorded media content instance to the incomplete recording, where the missing portions may be obtained from one or more of the other processing subsystems 110-2 through 110-N connected to the network 120. Accordingly, processing subsystem 110-1 may be configured to obtain a portion of a media content instance from the media content provider 111 and another portion of the media content instance from one or more other processing subsystems 110-2 through 110-N connected to the network 120.

In some embodiments, the processing subsystem 110-1 may be configured to invoke the content share application 153 in response to the occurrence of other events. As described below, for example, the media content provider 111 may provide instructions to any of the processing subsystems 110, the instructions being configured to cause the content share application 153 to be invoked for the purpose of acting as a provider of shared media content.

Figure 5:
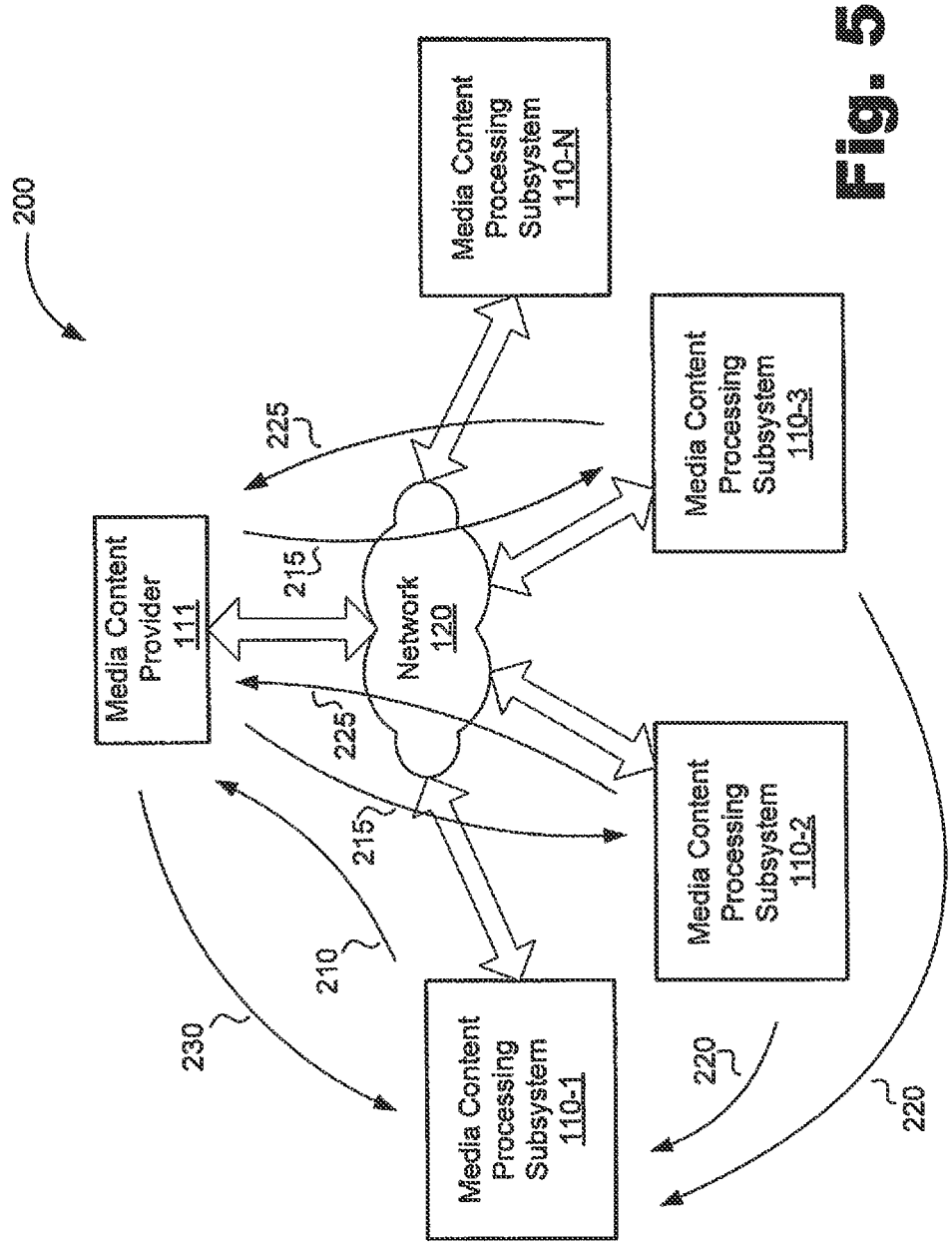
FIG. 5 illustrates exemplary content sharing functions that may be performed by various components of the system of FIG. 4, according to an embodiment.

To facilitate an understanding of content sharing features and functionality that may be provided by the system 200, FIG. 5 illustrates exemplary content sharing functions that can be performed by various components of the system 200, according to an embodiment. The functions shown in FIG. 5 may be performed in response to the processing subsystem 110-1 invoking content share application 153 to request shared media content, as described above. The functions shown in FIG. 5 may be performed while the media content processing subsystem 110-1 is concurrently receiving other media content from the media content provider 111 (using tuner 137 for example).

As represented by reference number 210, processing subsystem 110-1 may communicate with media content provider 111 to request a particular media content instance. The request may be marked as a shared content request such that the media content provider 111 is able to determine that the requested media content instance should be obtained from one or more of the other processing subsystems 110-2 through 110-N connected to network 120.

The media content provider 111 may be configured to identify, in response to the request, which, if any, of the other processing subsystems 110-2 through 110-N connected to network 120 includes a copy of, or at least a copy of a portion of, the requested media content instance. Typically, any of the processing subsystems 110-2 through 110-N having the requested media content instance have either previously recorded or are currently in the process of recording the requested media content instance for permanent storage. For example, processing subsystems 110-2 and 110-3 may be recording the requested media content instance as it is broadcast by and received from the media content provider 111. Accordingly, the receipt of shared media content may be delayed from its being broadcast by the media content provider 111, at least by sufficient time to allow for one or more other processing subsystems 110-2 through 110-N to record the media content and for the transmission of the media content to processing subsystem 110-1. As described below, the delay may be minimized by using multiple other processing subsystems 110-2 through 110-N to transmit a media content instance to processing subsystem 110-1.

The media content provider 111 may perform the identification in any suitable manner. In certain embodiments, for example, the media content provider 111 may query processing subsystems 110-2 through 110-N for the requested media content instance. In response, the processing subsystems 110-2 through 110-N may be configured to query their respective data stores (e.g., storage devices 134) to determine whether the requested media content, or a portion of the requested media content, is present (e.g., previously recorded or currently being recorded). This may be done by each of the processing subsystems 110-2 through 110-N invoking its content share application 153 in response to the query from the media content provider 111. The content share application 153 may then instruct processor 138 to query the storage device 134. In other embodiments, each content share application 153 may maintain a record of the media content instances stored in the storage device 134, which allows each of the processing subsystems 110-2 through 110-N to check its record of stored media content in response to a query from the media content provider 111, without having to query the storage device 134.

Each of the processing subsystems 110-2 through 110-N may respond to the media content provider 111 in the affirmative or the negative based on whether the requested media content instance is present. Alternatively or additionally, the processing subsystems 110-2 through 110-N may be configured to provide more detailed information to the media content provider 111, including information identifying specific portions (e.g., segments) of the requested media content that are stored on the processing subsystems 110-2 through 110-N, the recording status of the requested media content instance, the availability status of the processing subsystems 110-2 through 110-N (e.g., available or unavailable to share media content), and any other information potentially useful by the media content provider 111 in generating and issuing transmission instructions.

In other embodiments, the media content provider 111 may be configured to maintain a record of recording information that is descriptive of the media content instances (and/or portions thereof) that are stored on the processing subsystems 110, including media content that has been previously recorded or is currently being recorded. For example, the media content provider 111 may be configured to track processing subsystem actions that record, edit, and/or delete media content. The gathered information may be used to generate and maintain (e.g., update) the information included in the record. This allows the media content provider 111 to quickly identify media content that is available for sharing, without having to query the media content processing subsystems 110 for each request for shared content. The media content provider 111 may also maintain a record of the availability status of each processing subsystem 110, or the media content provider 111 may still query the processing subsystems 110 for their availability statuses in response to a request for shared media content.

Once those of the processing subsystems 110-2 through 110-N that are available and include the requested media content (or portions thereof) have been identified, media content provider 111 may instruct, as represented by reference number 215 in FIG. 5, at least a subset of the identified processing subsystems 110-2 through 110-N to transmit the requested media content to the requesting media content processing subsystem 110-1. Those of the processing subsystems 110-2 through 110-N receiving transmission instructions from the media content provider 111 may transmit the requested media content to the requesting processing subsystem 110-1 over the network 120, as represented by reference numeral 220. The transmission of shared content may include the instructed media content processing subsystems 110 invoking their respective shared content applications 153, which may be configured to initiate transmission functions.

The shared content processing unit 145 may be configured with any functionality and/or devices potentially useful for transmitting media content from a processing subsystem (e.g., processing subsystem 110-2) to another processing subsystem (e.g., processing subsystem 110-1). In certain embodiments, each of the processing subsystems 110 is configured to transmit media content as streams of data packets. Each packet or stream of packets may be tagged such that it may be identified as belonging to a particular media content instance. The tags may also identify an order of the packets. As described below, tagging can be used by a media content processing subsystem 110-1 receiving the data packets to assemble them into a media content instance. Of course, data representative of shared media content can be transmitted between the processing subsystems 110 using any suitable technologies, including any of the communication technologies mentioned above.

As shown in FIG. 5, the shared media content may be transmitted from one or more of the processing subsystems 110-2 through 110-N directly to the requesting processing subsystem 110-1, without going through the media content provider 111. Among other benefits, this helps to minimize the transmission time of the media content and the processing demands of the media content provider 111.

The requested media content instance may be transmitted to the processing subsystem 110-1 from one, or more than one of the processing subsystems 110-2 through 110-N. For example, processing subsystem 110-2 may transmit the entire media content instance to the processing subsystem 110-1, or processing subsystem 110-2 and 110-3 may each transmit different portions of the media content instance to the processing subsystem 110-1. The number and particular ones of the processing subsystems 110-2 through 110-N used to transmit a media content instance may be selected by the media content provider 111. The selection may be based on which of the processing subsystems 110-2 through 110-N include the requested media content instance, the availability of the processing subsystems 110-2 through 110-N, service level agreements of the users associated with the processing subsystems 110-2 through 110-N, and any other potentially helpful factor. In certain embodiments, media content provider 111 is configured to select all of the processing subsystems 110-2 through 110-N that are available and that include the requested media content instance. For illustrative purposes, FIG. 5 shows processing subsystems 110-2 and 110-3 transmitting portions of the requested media content to processing subsystem 110-1, as represented by reference numeral 220.

The use of multiple of the processing subsystems 110-2 through 110-N to transmit the requested media content instance helps decrease the transmission time for the requested media content instance. This in turn helps minimize the after-broadcast delay in the processing subsystem 110-1 receiving the media content instance. Redundancy between the processing subsystems 110-2 through 110-N is also readily available when multiple of the processing subsystems 110-2 through 110-N are used to transmit the media content instance. This helps prevent or at least minimize the effects of any errors that may occur when any of the processing subsystems 110-2 through 110-N transmitting shared media content goes offline or otherwise becomes unavailable on the network 120.

Whether one or multiple of the processing subsystems 110-2 through 110-N provides the requested media content, the media content provider 111 may be configured to manage the data traffic associated with the transmission of the media content instance. For example, the media content provider 111 may be configured to control which of the processing subsystems 110-2 through 110-N is used to transmit the requested media content, as well as which portions of the media content are transmitted by which of the processing subsystems 110-2 through 110-N. The traffic managing capabilities of the media content provider 111 allow the use of multiple of the processing subsystems 110-2 through 110-N to concurrently transmit different portions of the media content instance in a controlled manner that enables processing subsystem 110-1 to properly assembled the received data into the media content instance.

The media content provider 111 may be configured to control other aspects of the sharing of media content. For example, the media content provider 111 may control which of the processing subsystems 110 are allowed to participate in the sharing of media content. This may be based on subscriptions or service level agreements of users of the processing subsystems 110. Accordingly, the media content provider 111 is able to keep the sharing of media content within a closed and identifiable group of users. In addition, the media content provider 111 may be configured to charge subscribers for receipt of shared content and/or to issue payment credits to subscribers for transmission of shared content, as described below.

As part of the media content provider 111 managing transmissions of media content between processing subsystems 110, the processing subsystems 110 may be configured to provide transmission status information to the media content provider 111 for use in managing the data traffic. As described above and illustrated by reference number 215 in the example of FIG. 5, processing subsystems 110-2 and 110-3 may be instructed to transmit the requested media content to processing subsystem 110-1. Along with performing the transmissions, processing subsystems 110-2 and 110-3 may be configured to provide associated transmission status information to the media content provider 111, as represented by reference numeral 225 in FIG. 5. In certain embodiments, for example, transmissions of media content are performed using packets of data, and the processing subsystems 110-2 and 110-3 are configured to provide information descriptive of the packets and their transmissions, including, but not limited to, content information, timestamp information, information descriptive of the transmission order of the packets in relation to one another, information descriptive of the order of the packets in relation to one another in an assembled media content instance, source and destination identifiers (e.g., network addresses), and packet tags or other identifiers.

The media content provider 111 may be configured to use the transmission status information to verify that the requested media content is being transmitted in accordance with the transmission instructions provided by the media content provider 111. For example, the media content provider 111 may be configured to perform checksum operations, which are well known. Of course, any other suitable verification operations may be employed.

Processing subsystem 110-1 may be configured to verify that the received data traffic matches up with the transmitted data traffic. The processing subsystem 110-1 may be configured to perform checksum operations or any other suitable verification operations. In certain embodiments, as represented by reference number 230 in FIG. 5, media content provider 111 may be configured to provide a copy of the transmission status information to processing subsystem 110-1. The transmission status information may be used by the processing subsystem 110-1 to verify that the correct data traffic is received.

The processing subsystem 110-1 may be configured with any suitable technologies for assembling the received data traffic into the requested media content instance. In certain embodiments, the transmitted data includes data packets having identifiers (e.g., tags as described above) included therein and useful for assembling the data packets into a sequence representative of the requested media content instance. Processing subsystem 110-1 may also be configured to use the transmission status information received from the media content provider 111 to assemble the received data traffic (e.g., data packets) into a media content instance.

Each of the processing subsystems 110 may be configured to perform the above-described content sharing functions. In particular, each of the processing subsystems 110 may be configured to receive, provide, or both receive and provide shared media content. In certain embodiments, each processing subsystem 110 is configured to share any media content stored in its storage device 134. In other embodiments, each processing subsystem 110 is configured to share only media content that has been received directly from the media content provider 111 and recorded in the storage device 134. In other embodiments, the processing subsystems 110 have different permission settings allowing different levels of content sharing functionality, which levels may be based at least in part on user subscriptions or service level agreements.

The shared content application 153, shared content processing unit 145, and other components of each processing subsystem 110 may be configured to perform any of the processing subsystem content sharing functions described herein.

As mentioned, any of the above-described content sharing functions may be performed concurrently with the receiving of media content from the media content provider 111. Accordingly, the user of processing subsystem 110-1 is able to receive a first media content instance (e.g., COPS) as it is broadcast by and received from the media content provider 111. While the first media content instance is being received, processing subsystem 110-1 is able to receive one or more other media content instances from one or more of the processing subsystems 110-2 through 110-N that are connected to the network 120. For example, one or more of the processing subsystems 110-2 through 110-N (e.g., processing subsystems 110-2 and 110-3) may receive and record a second media content instance (e.g., FRIENDS) being broadcast by the media content provider 111. The above-described content sharing functions may be performed such that processing subsystem 110-1 requests and receives the second media content instance from processing subsystems 110-2 and 110-3.

C. Revenue from Shared Media Content Service

Media content provider 111 may provide any of the media content sharing functionality described above as a service to subscribers. The service may be provided free, as part of a package deal, or for an additional fee. Accordingly, the media content sharing service can be used to generate revenue and/or attract customers. In certain embodiments, subscribers paying a premium for media content sharing are able to share media content with one another within a community of subscribers. Accordingly, a subscriber paying for media content sharing services is able to expand the capacity of her processing subsystem (e.g., a set-top box) for receiving media content.

Subscribers who provide shared media content to other subscribers may be rewarded. In certain embodiments, for example, a subscriber may be given a credit on her subscription bill for each instance of her processing subsystem providing shared media content to another processing subsystem.

Any suitable fee arrangement may be employed, including charging subscribers a fee for each shared media content instance received from other processing subsystems. Alternatively, a subscriber may pay a flat fee regardless of the number of shared media content instances received from other processing subsystems 110.

To enhance the amount and/or variety of media content that is available for sharing, any of the processing subsystems 110 may be dedicated for recording and sharing media content with other processing subsystems 110. For example, certain of the processing subsystems 110 may be controlled by the media content provider 111 and used to record media content instances for sharing with other processing subsystems 110. This helps build a library of recorded content that is available for sharing between the processing subsystems 110. In certain embodiments, dedicated ones of the processing subsystems 110 may be instructed to record select media content that is unlikely or less likely than other media content to be recorded by subscribers.

III. Exemplary Process View

Figure 6:
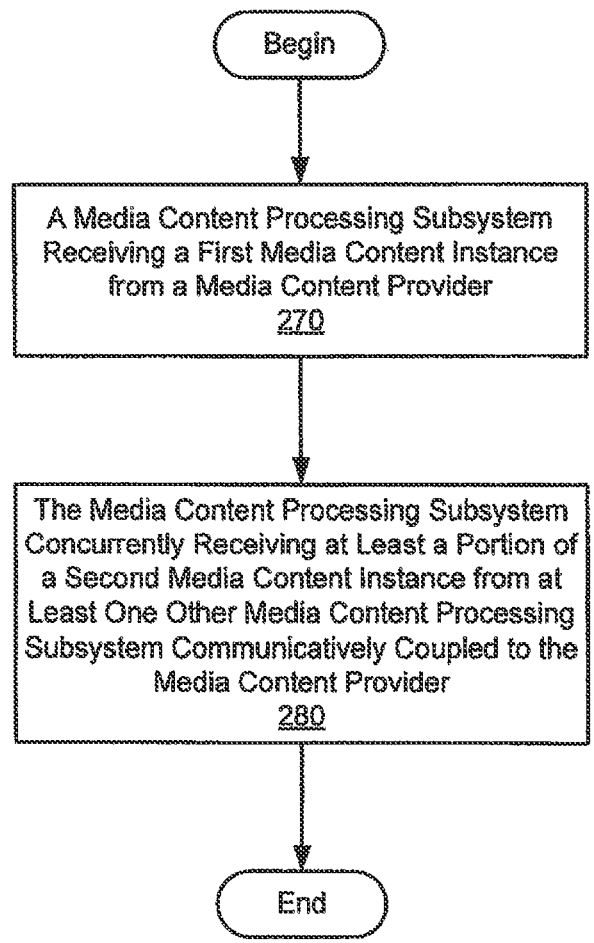
FIG. 6 is a flowchart illustrating an exemplary method of accessing media content, according to an embodiment.

FIG. 6 illustrates an exemplary method of accessing media content, according to an embodiment. While FIG. 6 illustrates exemplary steps according to one embodiment, other embodiments may omit, add to, reorder, and/or modify any of the steps shown in FIG. 6.

In step 270, a media content processing subsystem receives a first media content instance from a media content provider. Step 270 may be performed in any of the ways described above, including processing subsystem 110-1 receiving a first media content instance from media content provider 111. Step 270 may include the media content processing subsystem using a tuner to receive the first media content instance.

In step 280, the media content processing subsystem concurrently receives at least a portion of a second media content instance from at least one other media content processing subsystem communicatively coupled to the media content provider. Step 280 may be performed in any of the ways described above, including processing subsystem 110-1 receiving at least a portion of the second media content instance from any of the other processing subsystems 110-2 through 110-N connected to network 120. Step 280 may include performance of any of the steps illustrated in FIG. 7.

Figure 7:
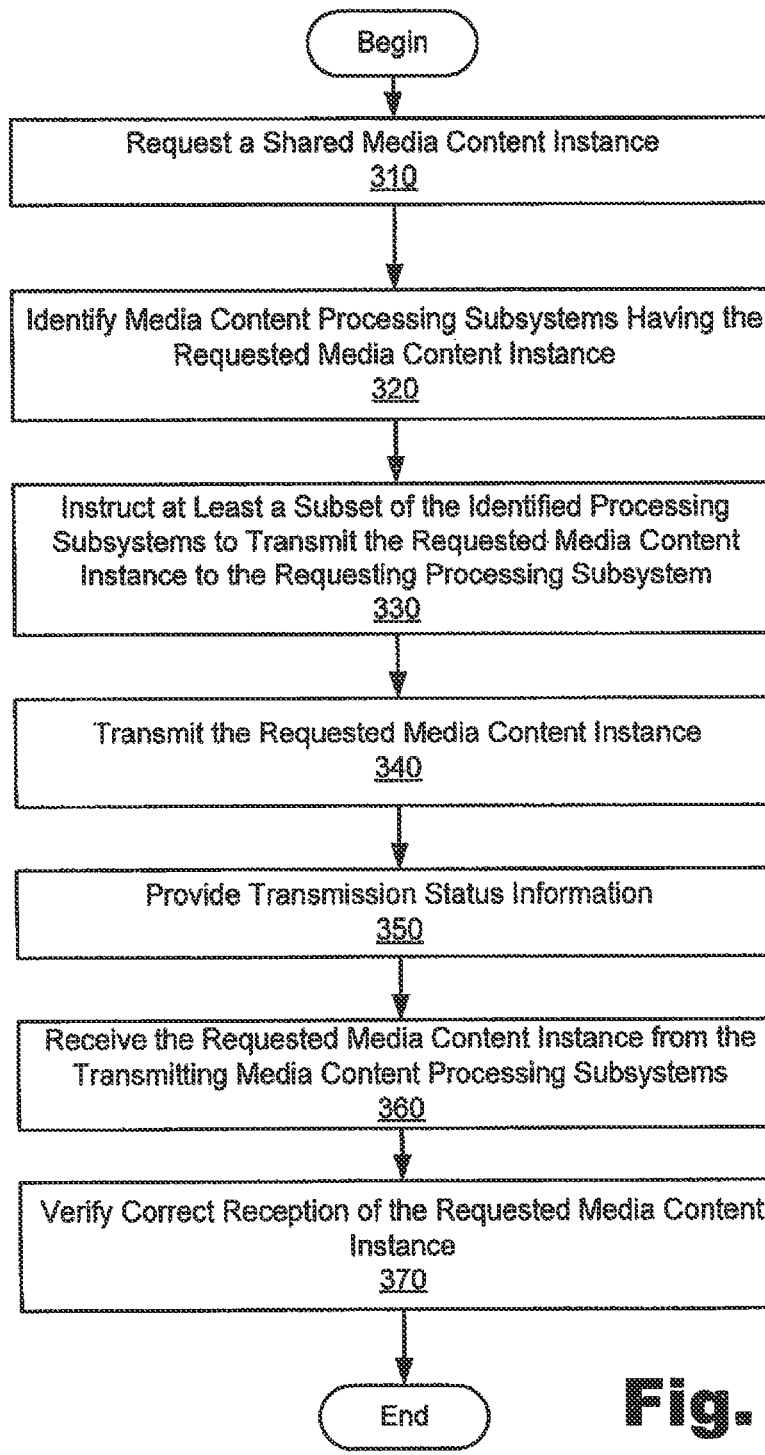
FIG. 7 is a flowchart illustrating an exemplary method of sharing media content between media content processing subsystems, according to an embodiment.

FIG. 7 illustrates an exemplary method of sharing media content between media content processing subsystems. While FIG. 7 illustrates exemplary steps according to one embodiment, other embodiments may omit, add to, reorder, and/or modify any of the steps shown in FIG. 7.

In step 310, a shared media content instance is requested. Step 310 may be performed in any of the ways described above, including processing subsystem 110-1 sending a request for the media content instance to media content provider 111.

In step 320, processing subsystems having the requested media content instance are identified. Step 320 may be performed in any of the ways described above, including media content provider 111 identifying those of the processing subsystems 110 that are available on the network 120 and that have the requested media content instance stored thereon.

In step 330, at least a subset of the processing subsystems identified in step 320 are instructed to transmit the requested media content instance to the requesting processing subsystem. Step 330 may be performed in any of the ways described above, including media content provider 111 providing transmission instructions to those of the identified processing subsystems 110 that are selected to transmit the media content instance to the requesting processing subsystem 110-1.

In step 340, the requested media content instance is transmitted to the requesting processing subsystem. Step 340 may be performed in any of the ways described above, including the instructed processing subsystem or subsystems transmitting data representative of the media content instance to the requesting processing subsystem 110-1 in accordance with the transmission instructions. As described above, the data may be transmitted directly to the requesting processing subsystem 110-1 without going through the media content provider 111.

In step 350, transmission status information is provided. Step 350 may be performed in any of the ways described above, including the transmitting processing subsystem(s) providing transmission status information to the media content provider 111. Step 350 may also include the media content provider 111 forwarding the transmission status information to the requesting processing subsystem 110-1.

In step 360, the requested media content instance is received from the transmitting media content processing subsystem(s). Step 360 may be performed in any of the ways described above, including the requesting processing subsystem 110-1 receiving data representative of the requested media content instance from one or more than one other media content processing subsystem connected to the network 120. Step 360 may also include the receiving media content processing subsystem 110-1 assembling the received data (e.g., streams of data packets) into the requested media content instance.

In step 370, correct reception of the requested media content instance is verified. Step 370 may be performed in any of the ways described above, including the receiving media content processing subsystem 110-1 performing verification operations such as checksum operations or comparisons of reception data and events with the transmission status information described above.

IV. Alternative Embodiments

The preceding description has been presented only to illustrate and describe exemplary embodiments with reference to the accompanying drawings. It will, however, be evident that various modifications and changes may be made thereto, and additional embodiments may be implemented, without departing from the scope of the invention as set forth in the claims that follow. The above description and accompanying drawings are accordingly to be regarded in an illustrative rather than a restrictive sense.

What is claimed is:

1. A method comprising:
   detecting, by a media content processing subsystem including at least one tuner, a request for the media content processing subsystem to use a tuner included in the at least one tuner to receive a media content instance transmitted by a media content provider over a network;
   determining, by the media content processing subsystem, that the at least one tuner is busy;
   sending, by the media content processing subsystem, a shared content request for the media content instance to the media content provider, the shared content request configured to cause the media content provider to
      identify at least one other media content processing subsystem that is able to receive the media content instance transmitted by the media content provider and provide the media content instance to the media content processing subsystem, and
      instruct the at least one other media content processing subsystem to transmit, to the media content processing subsystem, the media content instance received by the at least one other media content processing subsystem from the media content provider; and
   receiving, by the media content processing subsystem without using a tuner included in the at least one tuner, the media content instance from the at least one other media content processing subsystem.

2. The method of claim 1, wherein:
   the at least one other media content processing subsystem includes a plurality of other media content processing subsystems; and
   the receiving of the media content instance from the at least one other media content subsystem comprises the media content processing subsystem receiving a different portion of the media content instance from each media content processing subsystem included in the plurality of other media content processing subsystems.

3. The method of claim 2, wherein the shared content request is configured to cause the media content provider to instruct the at least one other media content processing subsystem to transmit the media content instance to the media content processing subsystem by instructing each other media content processing subsystem included in the plurality of other media content processing subsystems to transmit the different portion of the media content instance to the media content processing subsystem.

4. The method of claim 1, further comprising receiving, by the media content processing subsystem from the media content provider, transmission status information descriptive of the transmission of the media content instance from the at least one other media content processing subsystem to the media content processing subsystem.

5. The method of claim 4, further comprising using, by the media content processing subsystem, the transmission status information to verify correct receipt of the media content instance from the at least one other media content processing subsystem.

6. The method of claim 4, further comprising using, by the media content processing subsystem, the transmission status information to assemble data representative of the media content instance received from the at least one other media content processing subsystem.

7. The method of claim 1, further comprising:
   receiving, by the media content provider from the media content processing subsystem, the shared content request for the media content instance; and
   in response to the receiving of the shared content request
      identifying the at least one other media content processing subsystem as being able to receive the media content instance transmitted by the media content provider and provide the media content instance to the media content processing subsystem, and
      instructing the at least one other media content processing subsystem to transmit, to the media content processing subsystem, the media content instance received by the at least one other media content processing subsystem from the media content provider.

8. The method of claim 7, wherein the identifying of the at least one other media content processing subsystem as being able to receive the media content instance transmitted by the media content provider and provide the media content instance to the media content processing subsystem comprises determining that the at least one other media content processing subsystem contains a current or previous recording of the media content instance.

9. The method of claim 7, further comprising:
   receiving, by the at least one other media content processing subsystem from the media content provider, an instruction to transmit the media content instance to the media content processing subsystem;
   using, by the at least one other media content processing subsystem, at least one tuner included in the at least one other media content processing subsystem to receive the media content instance transmitted by the media content provider over the network; and
   transmitting, by the at least one other media content processing subsystem to the media content processing subsystem, the received media content instance as instructed by the media content provider.

10. The method of claim 1, embodied as computer-executable instructions on at least one non-transitory computer-readable medium.

11. A method comprising:
    sending, by a media content processing subsystem included in a plurality of media content processing subsystems configured to receive scheduled transmissions of media content instances from a media content provider by way of a network, a shared content request to the media content provider, the shared content request being for a media content instance included in the scheduled transmissions of media content instances from the media content provider, the shared content request configured to cause the media content provider to identify at least one other media content processing subsystem included in the plurality of media content processing subsystems that is able to provide the media content instance to the media content processing subsystem, and instruct the at least one other media content processing subsystem to transmit, to the media content processing subsystem, the media content instance received by the at least one other media content processing subsystem from the media content provider; and receiving, by the media content processing subsystem, the media content instance from the at least one other media content processing subsystem.

12. The method of claim 11, further comprising:

receiving, by the media content provider from the media content processing subsystem, the shared content request for the media content instance; and in response to the receiving of the shared content request identifying, by the media content provider, the at least one other media content processing subsystem included in the plurality of media content processing subsystem as being able to provide the media content instance to the media content processing subsystem, and instructing, by the media content provider, the at least one other media content processing subsystem to transmit, to the media content processing subsystem, the media content instance received by the at least one other media content processing subsystem from the media content provider.

13. The method of claim 12, wherein the identifying of the at least one other media content processing subsystem as being able to provide the media content instance to the media content processing subsystem comprises determining that the at least one other media content processing subsystem contains a current or previous recording of the media content instance.

14. The method of claim 12, further comprising:

receiving, by at least one other media content processing subsystem from the media content provider, the media content instance;

receiving, by the at least one other media content processing subsystem from the media content provider, an instruction to transmit the media content instance to the media content processing subsystem; and transmitting, by the at least one other media content processing subsystem to the media content processing subsystem, the media content instance as instructed by the media content provider.

15. The method of claim 14, wherein the receiving, by the at least one other media content processing subsystem, of the media content instance from the media content provider comprises the at least one other media content processing subsystem using at least one tuner included in the at least one other media content processing subsystem to receive the media content instance transmitted by the media content provider over the network.

16. The method of claim 15, wherein the receiving, by the media content processing subsystem, of the media content instance from the at least one other media content processing subsystem is performed without the media content processing subsystem using a tuner to receive the media content instance.

17. The method of claim 11, embodied as computer-executable instructions on at least one non-transitory computer-readable medium.

18. A system comprising:

a media content provider configured to transmit, over a network, a plurality of media content instances; and a plurality of media content processing subsystems remote from the media content provider and including tuners configured to receive the media content instances transmitted by the media content provider over the network;

a media content processing subsystem included in the plurality of media content processing subsystems and that detects a request for the media content processing subsystem to use a tuner included in the media content processing subsystem to receive a media content instance transmitted by the media content provider over the network, determines, by the media content processing subsystem, that each tuner included in the media content processing subsystem is busy, and sends, by the media content processing subsystem, a shared content request for the media content instance to the media content provider;

wherein the media content provider receives the shared content request for the media content instance from the media content processing subsystem, and in response to the receiving of the shared content request identifies at least one other media content processing subsystem included in the plurality of media content processing subsystems as being able to provide the media content instance to the media content processing subsystem, and instructs the at least one other media content processing subsystem to transmit, to the media content processing subsystem, the media content instance received by the at least one other media content processing subsystem from the media content provider.

* * * * *